US009099151B2

(12) United States Patent
Miura et al.

(10) Patent No.: US 9,099,151 B2
(45) Date of Patent: Aug. 4, 2015

(54) MULTIMEDIA CONTENT EDITING SERVER, MULTIMEDIA CONTENT EDITING METHOD, PROGRAM, AND INTEGRATED CIRCUIT

(71) Applicant: Panasonic Corporation, Osaka (JP)

(72) Inventors: Kouji Miura, Osaka (JP); Naohisa Tanabe, Osaka (JP); Tomohiko Kitamura, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 28 days.

(21) Appl. No.: 14/009,629

(22) PCT Filed: Feb. 7, 2013

(86) PCT No.: PCT/JP2013/000667
§ 371 (c)(1),
(2) Date: Oct. 3, 2013

(87) PCT Pub. No.: WO2013/118505
PCT Pub. Date: Aug. 15, 2013

(65) Prior Publication Data
US 2014/0056576 A1 Feb. 27, 2014

(30) Foreign Application Priority Data
Feb. 9, 2012 (JP) .................................. 2012-025766

(51) Int. Cl.
*G11B 27/00* (2006.01)
*H04N 5/93* (2006.01)
(Continued)

(52) U.S. Cl.
CPC .......... *G11B 27/031* (2013.01); *H04L 65/4084* (2013.01); *H04L 65/602* (2013.01);
(Continued)

(58) Field of Classification Search
USPC .................. 386/278–290, 200–234, 239–248
See application file for complete search history.

(56) References Cited

U.S. PATENT DOCUMENTS 6,448,958 B1 * 9/2002 Muta ............................. 345/169
8,156,417 B2 4/2012 Sudoh et al.
(Continued)

FOREIGN PATENT DOCUMENTS

JP 11-134264 5/1999
JP 2001-211443 8/2001
(Continued)

OTHER PUBLICATIONS

International Search Report issued May 14, 2013 in International Application No. PCT/JP2013/000667.
(Continued)

*Primary Examiner* — Hung Dang
(74) *Attorney, Agent, or Firm* — Wenderoth, Lind & Ponack, L.L.P.

(57) ABSTRACT

An editing server is a multimedia content editing server that generates multimedia content including: media data including an image; and a media control script for controlling a reproduction scenario that includes at least one of a layout, a reproduction order, and a reproduction effect of the media data. The editing server includes: a script generation unit that generates the media control script, according to processing capability information that indicates a processing capability of a terminal for the media control script; and a multimedia content generation unit that generates the multimedia content including the media control script.

13 Claims, 29 Drawing Sheets

(51) Int. Cl.

| | | |
|---|---|---|
| *H04N 5/765* | (2006.01) | |
| *H04N 9/80* | (2006.01) | |
| *G11B 27/031* | (2006.01) | |
| *H04N 5/91* | (2006.01) | |
| *H04N 21/2343* | (2011.01) | |
| *H04N 21/258* | (2011.01) | |
| *H04N 21/2668* | (2011.01) | |
| *H04N 21/845* | (2011.01) | |
| *H04L 29/06* | (2006.01) | |
| *H04L 29/08* | (2006.01) | |

(52) U.S. Cl.
CPC ............... *H04N 5/765* (2013.01); *H04N 5/91* (2013.01); *H04N 21/23439* (2013.01); *H04N 21/25833* (2013.01); *H04N 21/2668* (2013.01); *H04N 21/8451* (2013.01); *H04L 67/303* (2013.01)

(56) References Cited

U.S. PATENT DOCUMENTS

| | | | |
|---|---|---|---|
| 2004/0133924 A1* | 7/2004 | Wilkins et al. | 725/135 |
| 2006/0031281 A1 | 2/2006 | Shen et al. | |
| 2006/0053468 A1 | 3/2006 | Sudoh et al. | |
| 2009/0222489 A1 | 9/2009 | Sudoh et al. | |
| 2010/0242087 A1 | 9/2010 | Matsumoto | |
| 2011/0035649 A1 | 2/2011 | Sudoh et al. | |
| 2011/0041071 A1 | 2/2011 | Sudoh et al. | |
| 2012/0174174 A1 | 7/2012 | Ozawa | |
| 2013/0054611 A1* | 2/2013 | Lee | 707/741 |

FOREIGN PATENT DOCUMENTS

| | | |
|---|---|---|
| JP | 2002-297494 | 10/2002 |
| JP | 2004-265067 | 9/2004 |
| JP | 2004-343683 | 12/2004 |
| JP | 2007-48154 | 2/2007 |
| JP | 3987025 | 10/2007 |
| JP | 3987096 | 10/2007 |
| JP | 2007-295552 | 11/2007 |
| JP | 4362447 | 11/2009 |
| JP | 4369434 | 11/2009 |
| WO | 2004/036913 | 4/2004 |
| WO | 2004/054254 | 6/2004 |
| WO | 2011/030811 | 3/2011 |

OTHER PUBLICATIONS

Nikkei Personal Computing, Jul. 13, 2009, pp. 66-75, Publisher: Nikkei Business Publications, Inc. with partial English translation.

* cited by examiner

FIG. 7

| Multimedia content storage location | Editor ID | Template ID | Theme ID | Material table ID |
|---|---|---|---|---|
| file://contents/birthday/ | KM | PM0001 | 0001 | 8761 |
| file://contents/ski2011/ | KM | Null | Null | 8721 |
| https://mylocker.com/km/ | KM | KM0001 | Null | 8743 |
| https://mylocker.com/em/ | EM | KM0009 | Null | 2321 |
| https://photomovie.com/s/ | EM | PM0001 | 0001 | 3627 |

FIG. 8

| Material table ID 322 | Material ID 323 | Material type 324 | Material data 325 |
|---|---|---|---|
| 8761 | KM0001 | image/jpeg | dsc000007621.jpg |
| 8761 | KM0002 | image/jpeg | dsc000007622.jpg |
| 8761 | PM4001 | audio/mpeg | birthday.mp3 |
| 8761 | PM8001 | application/script | happy.js |

| Template ID | Template name | Theme ID | Theme name | Material table ID | Template thumbnail |
|---|---|---|---|---|---|
| PM0001 | Cake No1 | 0001 | Birthday | 3628 | file://th/pm0001.jpg |
| PM0002 | Clapping No1 | 0001 | Birthday | 2186 | file://th/pm0001.jpg |
| PM0003 | Camera No1 | 0002 | Travel | 9843 | file://th/pm0001.jpg |
| PM0004 | Sea No1 | Null | Null | 0891 | file://th/pm0001.jpg |

FIG. 11

| Material table ID | Material ID | Material type | Material data |
|---|---|---|---|
| 3628 | PM2001 | image/jpeg | file://decorations/cake001.jpg |
| 3628 | PM2002 | image/jpeg | file://decorations/cake002.jpg |
| 3628 | PM4001 | audio/mpeg | file://BGMs/birthday.mp3 |
| 3628 | S0001 | application/script | file://scripts/happy.js |

FIG. 12

| Material ID | Script data |
|---|---|
| S0001 | file://scripts/happy.js |
| S0002 | file://scripts/camera.js |
| S0003 | file://scripts/ocean.js |
| S3298 | https://mylocker.com/km/scripts/vivid.js |

FIG. 13

| Material ID | Material type | Material data |
|---|---|---|
| PM2011 | image/jpeg | file://decorations/star001.jpg |
| PM2012 | image/jpeg | file://decorations/star002.jpg |
| KM0010 | image/jpeg | https://mylocker.com/km/photos/01.jpg |
| KM0011 | image/jpeg | https://mylocker.com/km/photos/02.jpg |

- Initial value setting part — 501
- Drawing processing part — 502
- BGM reproduction processing part — 503

511

| Archive type | application/x-tar | 512 |
|---|---|---|
| Archive ID | 2168FE75A01··· | 513 |
| Archive file name | PM0001.tp1 | 514 |
| Archive size | 3974399024 | 515 |
| Material count | 4 | 516 |
| Material type | image/jpg | 517 |
| Material ID | PM2001 | 518 |
| Material file name | cake001.jpg | 519 |
| Material size | 327876 | 520 |
| Material data | ······ | 521 |
| Material type | image/jpg | |

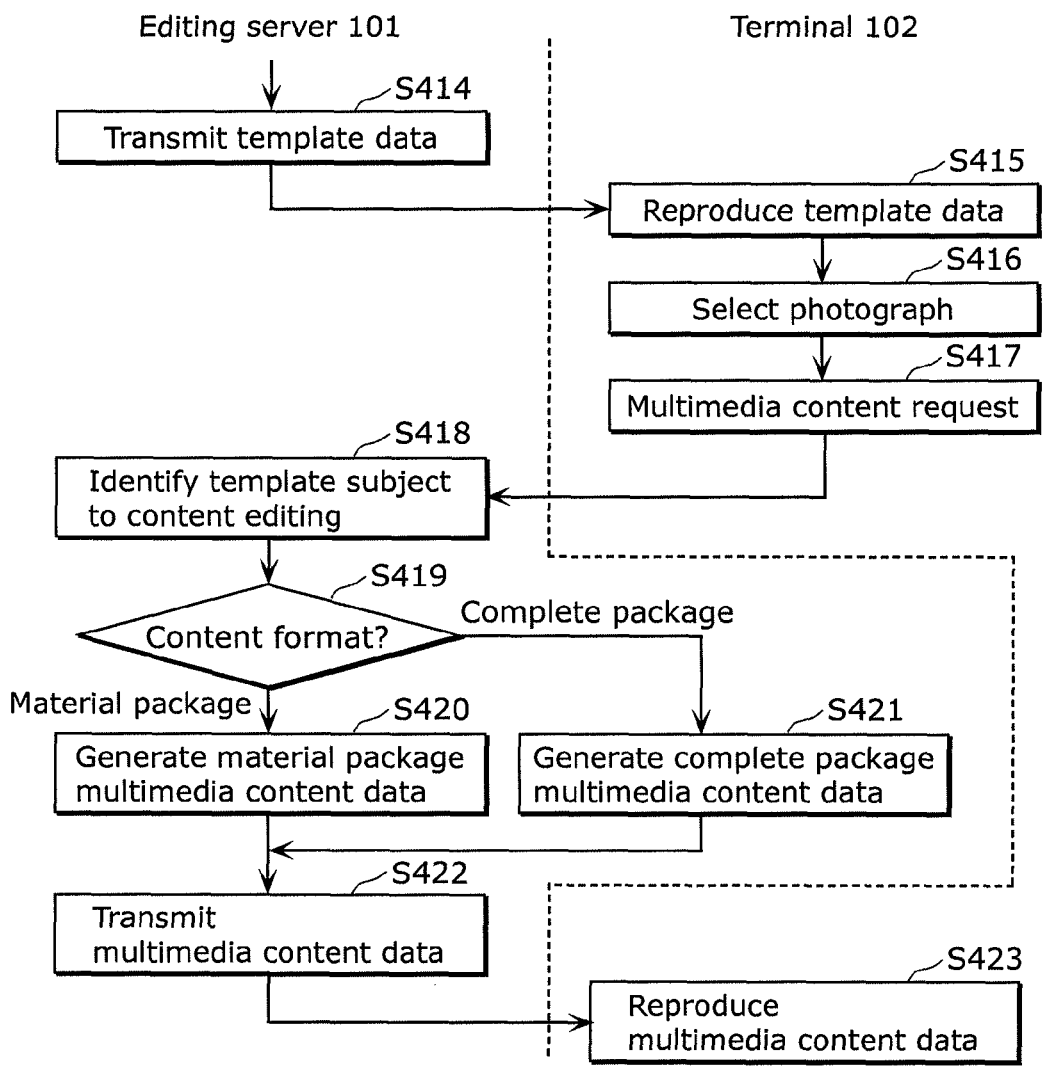
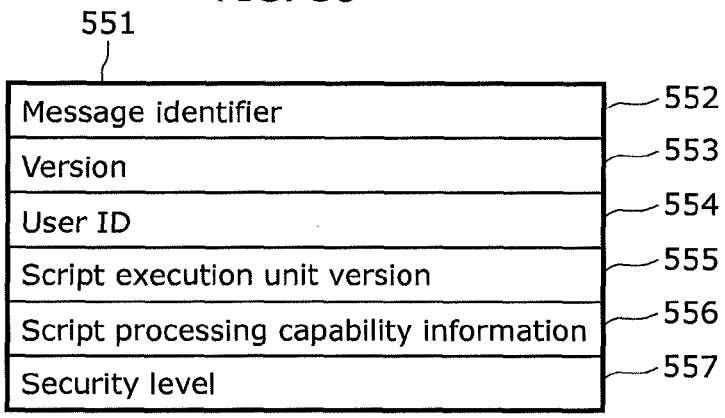

MULTIMEDIA CONTENT EDITING SERVER, MULTIMEDIA CONTENT EDITING METHOD, PROGRAM, AND INTEGRATED CIRCUIT

TECHNICAL FIELD

The present invention relates to a multimedia content editing server that generates multimedia content including: media data including an image; and a media control script for controlling a reproduction scenario that includes at least one of a layout, a reproduction order, and a reproduction effect of the media data.

BACKGROUND ART

With the widespread use of digital still cameras, digital video cameras, and camera phones, the usage pattern in which captured digital photographs or digital video (hereafter referred to as "photographs" and "video", respectively) are viewed on a terminal apparatus (hereafter also referred to as "terminal") such as an imaging apparatus, a television, or a personal computer (PC) has increased in recent years. Moreover, the proliferation of the Internet and mobile phones has allowed users to exchange content such as photographs and video stored in their terminals with friends via a network.

Captured photographs and video may be viewed individually, or viewed in the form of a photo movie. The photo movie is one form of multimedia content: captured photographs or video are given background music (BGM) and one or more decoration images and reproduced in chronological order like a movie. The photo movie is described in, for example, Non Patent Literature (NPL) 1.

A processing apparatus capable of easily generating multimedia content is described in Patent Literature (PTL) 1. The processing apparatus described in PTL 1 is a terminal that aids in reproduction of multimedia content and generation of multimedia content by a user through the use of a template and a script included in the template.

CITATION LIST

Patent Literature

[PTL 1]
Japanese Patent Publication No. 3987025

Non Patent Literature

[NPL 1]
Nikkei Personal Computing, Jul. 13, 2009, Feature 3: Create a photo movie, Nikkei Business Publications, Inc.

SUMMARY OF INVENTION

Technical Problem

In such a system including a processing apparatus (multimedia editing server) and a terminal apparatus which reproduces multimedia content, it is desirable that multimedia content according to processing performance of the terminal apparatus is reproduced in the terminal apparatus.

In view of this, the present invention has an object of providing a multimedia content editing server capable of generating multimedia content according to processing performance of a terminal apparatus.

Solution to Problem

To achieve the stated object, a multimedia content editing server according to an aspect of the present invention is a multimedia content editing server that generates multimedia content including: media data including an image; and a media control script for controlling a reproduction scenario that includes at least one of a layout, a reproduction order, and a reproduction effect of the media data, the multimedia content editing server including: a script generation unit that generates the media control script, according to processing capability information that indicates a processing capability of a terminal apparatus for the media control script; and a multimedia content generation unit that generates the multimedia content including the media control script.

These general and specific aspects may be implemented using a system, a method, an integrated circuit, a computer program, or a computer-readable recording medium such as a CD-ROM, or any combination of systems, methods, integrated circuits, computer programs, and recording media.

Advantageous Effects of Invention

The present invention can provide a multimedia content editing server capable of generating multimedia content according to processing performance of a terminal apparatus.

BRIEF DESCRIPTION OF DRAWINGS

FIG. 7 is a diagram showing an example of data stored in a content information storage unit according to the embodiment.

FIG. 8 is a diagram showing an example of data included in a material table according to the embodiment.

FIG. 10 is a diagram showing an example of data stored in a template information storage unit according to the embodiment.

FIG. 11 is a diagram showing an example of data included in a material table according to the embodiment.

FIG. 12 is a diagram showing an example of data stored in a script storage unit according to the embodiment.

FIG. 13 is a diagram showing an example of data stored in a media data storage unit according to the embodiment.

FIG. 37B is a flowchart showing flow of a template editing process according to the embodiment.

FIG. 38 is a diagram showing message data included in a content editing request message according to the embodiment.

DESCRIPTION OF EMBODIMENTS

Figure 1A:
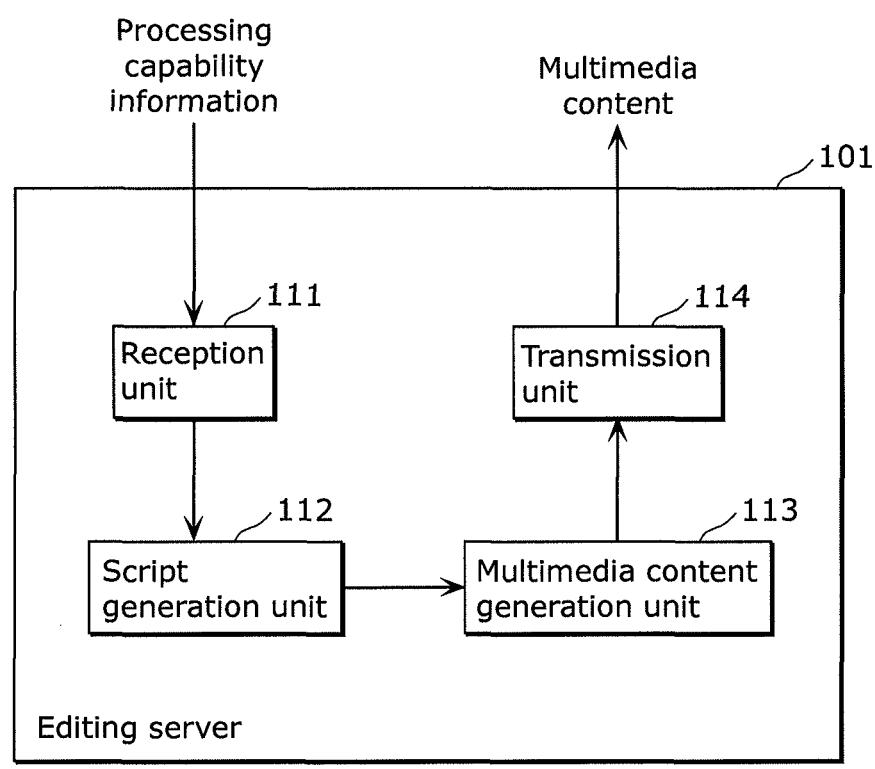
FIG. 1A is a block diagram showing a schematic structure of an editing server according to an embodiment.

Underlying Knowledge Forming Basis of the Present Invention

The present inventors have found the following problems with the conventional technique.

Content formats of multimedia content include a material package format and a complete package format. The material package format is a format in which photographs, video, and the like as materials constituting multimedia content and a media control script are archived. In this format, various edits are possible as materials can be replaced and partially updated, but a reproduction terminal needs to have a script execution function in order to reproduce the multimedia content.

The complete package format is a video stream form having the same presentation as in the case where multimedia content in the material package format is reproduced. The video stream form is realized by, for example, MPEG-2 TS (Motion Picture Expert Group-2 Transport Stream) or MPEG-4. In this format, only limited edits such as partial deletion of a video stream are possible, but the script execution function is unnecessary and the multimedia content can be reproduced in many terminals.

In this description, the term "multimedia content" alone with no mention of its format denotes multimedia content in the material package format. In the case where the material package format and the complete package format need to be distinguished, the names of the respective formats are stated.

A main feature of multimedia content is that the use of a media control script can achieve various presentations including: effects such as movement, rotation, and superimposition of photographs, video, decoration images, and the like on a screen; screen transition effects; and animation effects.

A process of a high presentation effect such as fast photograph movement and special screen transition is dependent on the script processing capability of the reproduction terminal that executes the media control script. Reproduction terminals have improved in processor capability over the years, and so have improved in script processing capability. This creates a demand to update multimedia content as a result of, for example, buying a new reproduction terminal. For instance, a user who bought a new reproduction terminal may want to view previously generated multimedia content on the new reproduction terminal higher in script processing capability, with maximum use of the presentation effects of the new reproduction terminal.

In more detail, though the user generated multimedia content with no photograph movement in the old terminal because of flicker caused when moving a photograph on a screen due to its script processing capability, as a result of buying the new reproduction terminal, the user may now want to use a dramatic effect of moving the photograph without changing the photograph being used. Moreover, in the case of sharing generated multimedia content with another user, the user may want to update the multimedia content. As an example, in the case where the user shares multimedia content generated using photographs of his or her child as materials with his or her grandparents, the user may want to re-edit the multimedia content so as to be displayed with flippable pages like a real album by making maximum use of the presentation effects of the grandparents' reproduction terminal.

However, the conventional multimedia content generation terminal and server fail to sufficiently meet such a need. That is, the conventional apparatuses have no function of determining or updating a media control script included in multimedia content according to the script processing capability of the reproduction terminal.

Besides, not all terminals are capable of reproducing multimedia content. Though the media reproduction function and the script execution function are necessary in order to reproduce multimedia content, some reproduction apparatuses have only the media reproduction function and do not have the script execution function. For example, the media reproduction function is an MPEG-2 decoder, and the script execution function is a virtual machine. There is a demand to view multimedia content on these apparatuses, too.

However, the conventional multimedia content generation terminal and server fail to sufficiently meet such a need. That is, the conventional apparatuses have no function of reconfiguring multimedia content for reproduction apparatuses having only the media reproduction function.

Multimedia content can be easily generated by embedding photographs or video in a template prepared beforehand. Thus, multimedia content generation using a template is effective. The user may also edit a template to suit his or her preferences. Upon template use or editing, the user selects a template to be used or edited. To do so, the user checks template designs and effects, on a terminal. Since a template is also multimedia content and includes a media control script, the above-mentioned problems concerning multimedia content equally apply to templates.

There are also instances where the user generates multimedia content using not only photographs or video captured by the user and a decoration image, a media control script, and the like generated by the user but also a decoration image and a media control script purchased from a commercial service. Since unauthorized copying of the purchased image or script is prohibited, it is necessary to prevent unauthorized use.

However, the conventional multimedia content generation terminal and server fail to sufficiently meet such a need. That is, the conventional apparatuses have no function of preventing unauthorized use of a material included in multimedia content in a reproduction apparatus of a low security level.

Accordingly, this embodiment describes an editing system, a server apparatus, a terminal apparatus, and an editing method for editing multimedia content including: media data such as photographs, video, BGM, and decoration images; and a media control script for controlling the media data, with which the above-mentioned problems can be solved.

A multimedia content editing server according to an aspect of the present invention is a multimedia content editing server that generates multimedia content including: media data including an image; and a media control script for controlling a reproduction scenario that includes at least one of a layout, a reproduction order, and a reproduction effect of the media data, the multimedia content editing server including: a script generation unit that generates the media control script, according to processing capability information that indicates a processing capability of a terminal apparatus for the media control script; and a multimedia content generation unit that generates the multimedia content including the media control script.

With this structure, the multimedia content editing server can generate the media control script included in the multimedia content according to the script processing capability of the terminal apparatus.

For example, the reproduction scenario may indicate a movement of the image as the reproduction effect, wherein the script generation unit generates, in the case where the processing capability is a first value, the media control script that causes the movement of the image to be larger or faster than in the case where the processing capability is a second value lower than the first value.

With this structure, the multimedia content editing server can generate the multimedia content suitable for the terminal apparatus, according to the script processing capability of the terminal apparatus.

For example, the multimedia content editing server may further include a format determination unit that determines a content format of the multimedia content according to the processing capability indicated by the processing capability information, wherein the multimedia content generation unit generates the multimedia content in the content format determined by the multimedia content format determination unit.

With this structure, the multimedia content editing server can determine the format of the multimedia content according to the script processing capability of the terminal apparatus.

For example, the format determination unit may select one of a material package format and a complete package format, as the content format, wherein the multimedia content generation unit includes: a script execution unit that executes the media control script; a material package generation unit that generates the multimedia content in the material package format in the case where the format determination unit selects the material package format as the content format, the multimedia content in the material package format including the media data and the media control script; and a complete package generation unit that generates the multimedia content in the complete package format in the case where the format determination unit selects the complete package format, the multimedia content in the complete package format being video data obtained by the script execution unit executing the media control script.

With this structure, the multimedia content editing server can determine one of the material package format and the complete package format as the format of the multimedia content, according to the script processing capability of the terminal apparatus.

For example, the format determination unit may select the material package format in the case where the processing capability information indicates that the terminal apparatus has a runtime environment for the media control script, and select the complete package format in the case where the processing capability information indicates that the terminal apparatus does not have the runtime environment for the media control script.

With this structure, the terminal apparatus can edit and reproduce the multimedia content, regardless of whether or not the terminal apparatus has the runtime environment for the media control script.

For example, the multimedia content editing server may further include a format determination unit that receives a security level of the terminal apparatus from the terminal apparatus, and determines a content format of the multimedia content according to the security level, wherein the multimedia content generation unit generates the multimedia content in the content format determined by the multimedia content format determination unit.

With this structure, the multimedia content editing server can determine the format of the multimedia content according to the security level of the terminal apparatus.

For example, the format determination unit may select one of a material package format and a complete package format, as the content format, wherein the multimedia content generation unit includes: a script execution unit that executes the media control script; a material package generation unit that generates the multimedia content in the material package format in the case where the format determination unit selects the material package format as the content format, the multimedia content in the material package format including the media data and the media control script; and a complete package generation unit that generates the multimedia content in the complete package format in the case where the format determination unit selects the complete package format, the multimedia content in the complete package format being video data obtained by the script execution unit executing the media control script.

With this structure, the multimedia content editing server can determine one of the material package format and the complete package format as the format of the multimedia content, according to the security level of the terminal apparatus. Unauthorized use of a material included in the multimedia content in a terminal apparatus of a low security level can thus be prevented.

For example, in the case where the format determination unit selects the complete package format, the multimedia content editing server may further: transmit the multimedia content to the terminal apparatus in a download distribution mode in the case where the security level of the terminal apparatus is a first level; and transmit the multimedia content to the terminal apparatus in a streaming distribution mode in the case where the security level of the terminal apparatus is a second level lower than the first level.

With this structure, the multimedia content editing server can determine one of the download distribution mode and the streaming distribution mode as the format of the multimedia content, according to the security level of the terminal apparatus. Unauthorized use of a material included in the multimedia content in a terminal apparatus of a low security level can thus be prevented.

For example, the multimedia content generation unit may include a material information embedment unit that adds material information to the multimedia content in the case where the format determination unit selects the complete package format, the material information indicating storage locations of the media data and the media control script.

With this structure, the multimedia content editing server and the terminal apparatus can easily identify the materials to be edited, when re-editing the multimedia content. The multimedia content editing server and the terminal apparatus can also easily track the sharer in the case where the multimedia content is shared.

For example, the multimedia content generation unit may further include a material information protection unit that protects the material information.

With this structure, the multimedia content editing server can prevent unauthorized replacement of the materials to be edited when re-editing the multimedia content, and also prevent unauthorized replacement of the sharer tracking information.

For example, the script generation unit may generate a new media control script by combining a plurality of media control scripts to be updated.

With this structure, the user can generate multimedia content that can be successively viewed by combining multimedia content, or generate a favorite scenario by editing templates of multimedia content.

For example, the script generation unit may generate a new media control script by replacing a part or whole of a media control script to be updated.

With this structure, the user can change the scenario of the template alone, without changing the materials of the multimedia content.

For example, the script generation unit may generate a new media control script by deleting a part of a media control script to be updated.

With this structure, the multimedia content editing server can remove a part or whole of the reproduction effect of the multimedia content. The multimedia content editing server can thus generate the multimedia content for a non-interactive terminal.

A multimedia content editing method according to an aspect of the present invention is a multimedia content editing method for generating multimedia content including: media data including an image; and a media control script for controlling a reproduction scenario that includes at least one of a layout, a reproduction order, and a reproduction effect of the media data, the multimedia content editing method including: generating the media control script, according to processing capability information that indicates a processing capability of a terminal apparatus for the media control script; and generating the multimedia content including the media control script.

With this multimedia content editing method, the media control script included in the multimedia content can be generated according to the script processing capability of the terminal apparatus.

These general and specific aspects may be implemented using a system, a method, an integrated circuit, a computer program, or a computer-readable recording medium such as a CD-ROM, or any combination of systems, methods, integrated circuits, computer programs, and recording media.

The following describes the embodiment in detail, with reference to drawings.

The embodiment described below shows a general or specific example. The numerical values, shapes, materials, structural elements, the arrangement and connection of the structural elements, steps, the processing order of the steps etc. shown in the following embodiment are mere examples, and do not limit the scope of the present invention. Among the structural elements in the embodiment described below, the structural elements not recited in any one of the independent claims representing the broadest concepts are described as arbitrary structural elements.

Embodiment

A schematic structure and operation of a multimedia content editing server according to this embodiment are described first.

FIG. 1A is a block diagram showing a schematic structure of an editing server 101 which is the multimedia content editing server according to this embodiment. The editing server 101 shown in FIG. 1A generates multimedia content in the material package format including: media data including an image; and a media control script for controlling a reproduction scenario that includes at least one of a layout, a reproduction order, and a reproduction effect of the media data. The editing server 101 includes a reception unit 111, a script generation unit 112, a multimedia content generation unit 113, and a transmission unit 114.

The reception unit 111 receives processing capability information (also referred to as "script processing capability information") indicating a media control script processing capability of a terminal apparatus, from the terminal apparatus. The script generation unit 112 generates a media control script according to the processing capability indicated by the processing capability information received by the reception unit 111. The multimedia content generation unit 113 generates multimedia content including the media control script generated by the script generation unit 112. The transmission unit 114 transmits the multimedia content generated by the multimedia content generation unit 113, to the terminal apparatus.

The terminal apparatus reproduces the multimedia content by executing the media control script included in the multimedia content. In detail, the multimedia content is a photo movie. The photo movie is one form of multimedia content: captured photographs or video are given BGM and one or more decoration images and reproduced in chronological order like a movie.

Figure 1B:
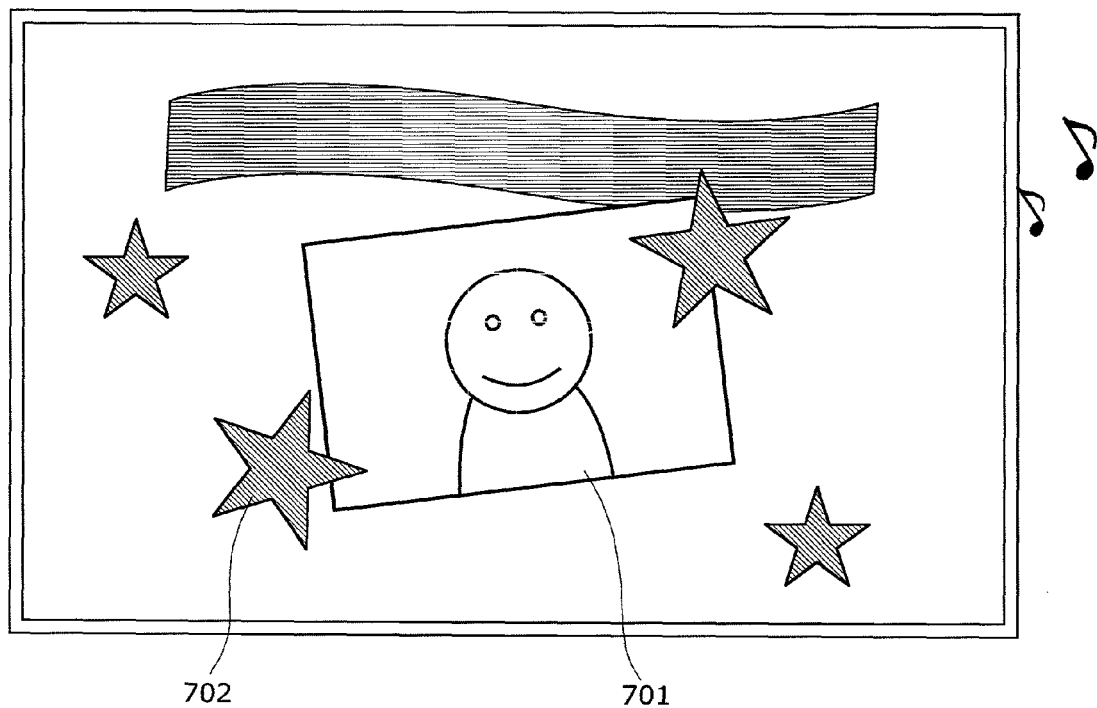
FIG. 1B is a diagram showing an example of a photo movie according to the embodiment.

FIG. 1B is a diagram showing an example of display of multimedia content.

As shown in FIG. 1B, the multimedia content includes a user image 701 and a decoration image 702. The user image 701 is a photograph or video owned by the user.

That is, the media data typically includes a plurality of user images (still or moving images), one or more pieces of BGM (music), and one or more decoration images. Note that the media data may include at least one image. The number of user images, the number of pieces of BGM, and the number of decoration images may each be one or more. The media data may include both a still image and a moving image as user images. The media data may include audio (e.g. sound effect) other than BGM, and may include text data and the like.

The media control script controls a reproduction scenario of the media data. As a result of the terminal apparatus executing the media control script, the media data is reproduced according to the reproduction scenario. The reproduction scenario typically includes a layout (layout positions) of a plurality of user images and one or more decoration images, a reproduction order (reproduction timings) of the plurality of user images, one or more pieces of BGM, and the one or more decoration images, and a reproduction effect of the plurality of user images and the one or more decoration images. The reproduction effect includes movement of an image. The movement of the image includes a moving pattern, moving speed, enlargement, reduction, rotation, and the like of the image. The reproduction effect may also include image processing such as changing the color of the image. The reproduction effect may also include screen transition, an animation effect, and the like. The reproduction scenario and the reproduction effect may include all or only part of the above-mentioned features.

Figure 2A:
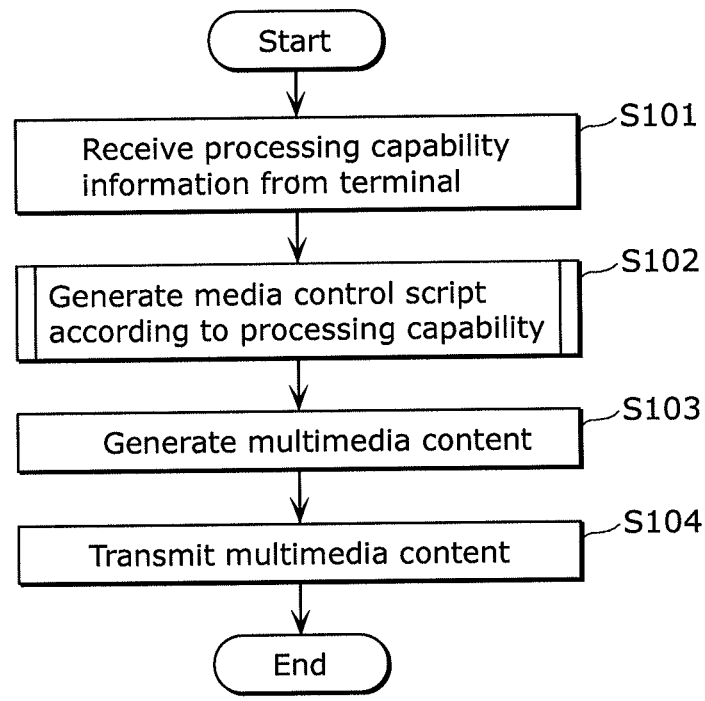
FIG. 2A is a flowchart of a multimedia content editing process according to the embodiment.

An overview of a multimedia content editing process by the multimedia content editing server 101 is given below. FIG. 2A is a flowchart of the multimedia content editing process by the editing server 101.

As shown in FIG. 2A, first the reception unit 111 receives the processing capability information indicating the media control script processing capability of the terminal apparatus, from the terminal apparatus (Step S101). Next, the script generation unit 112 generates the media control script according to the processing capability indicated by the received processing capability information (Step S102). Next, the multimedia content generation unit 113 generates the multimedia content including the generated media control script (Step S103). Lastly, the transmission unit 114 transmits the generated multimedia content to the terminal apparatus (Step S104).

Figure 2B:
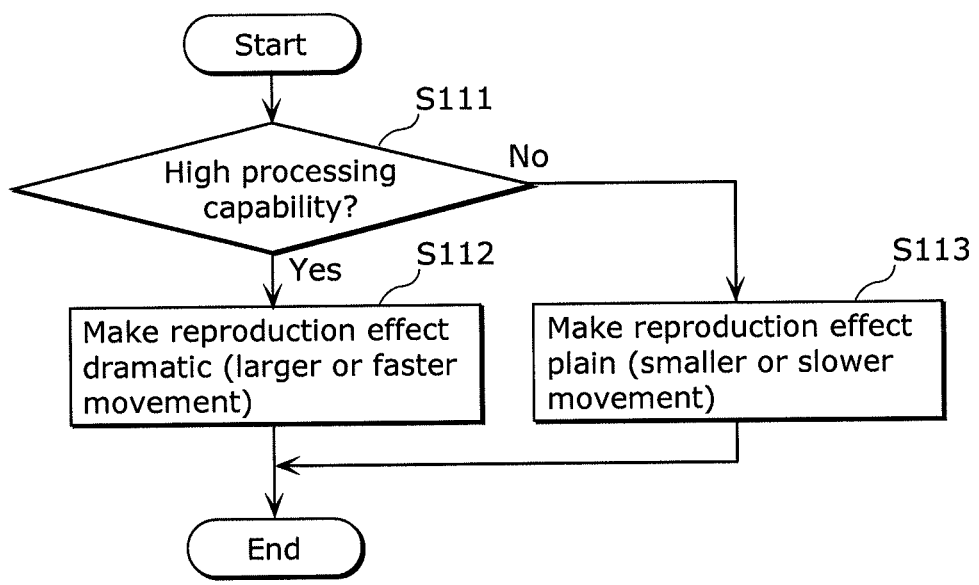
FIG. 2B is a flowchart of a media control script generation process according to the embodiment.

FIG. 2B is a flowchart of the media control script generation process (Step S102) by the editing server 101. As shown in FIG. 2B, in the case where the media control script processing capability of the terminal apparatus is high (e.g. in the case where the processing capability is higher than a predetermined threshold) (Step S111: Yes), the script generation unit 112 makes the reproduction effect by the media control script dramatic (Step S112). For example, the script generation unit 112 causes the image movement to be larger or faster. In the case where the media control script processing capability of the terminal apparatus is low (e.g. in the case where the processing capability is lower than the predetermined threshold) (Step S111: No), the script generation unit 112 makes the reproduction effect by the media control script plain (Step S113). For example, the script generation unit 112 causes the image movement to be smaller or slower.

The expression "causing the image movement to be larger or faster" includes changing an image from stationary to moving. Likewise, the expression "causing the image movement to be smaller or slower" includes changing an image from moving to stationary.

That is, in the case where the media control script processing capability of the terminal apparatus is a first value, the script generation unit 112 generates the media control script that causes the image movement to be larger or faster than in the case where the media control script processing capability is a second value lower than the first value.

In this way, the editing server 101 can generate optimal multimedia content according to the media control script processing capability of the terminal apparatus.

The script generation unit 112 may change the frequency of occurrence of image movement according to the media control script processing capability of the terminal apparatus. In detail, the script generation unit 112 may increase the frequency of occurrence of image movement in the case where the processing capability is high, and decrease the frequency of occurrence of image movement in the case where the processing capability is low.

Moreover, the script generation unit 112 may change the number of decoration images according to the media control script processing capability of the terminal apparatus. In detail, the script generation unit 112 may increase the number of decoration images in the case where the processing capability is high, and decrease the number of decoration images in the case where the processing capability is low.

Though the above describes an example where the editing server 101 changes the reproduction effect in two levels using one threshold, the editing server 101 may use a plurality of thresholds to change the reproduction effect in three or more levels.

The following describes a detailed structure and operation of the above-mentioned editing server 101.

Figure 3:
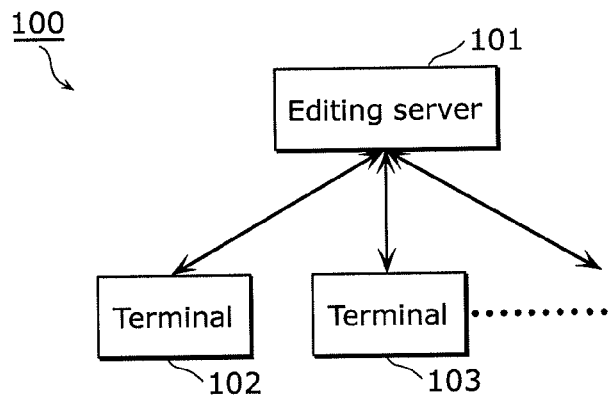
FIG. 3 is a block diagram showing a structure of a multimedia content editing system according to the embodiment.

FIG. 3 is a block diagram showing a structure of a multimedia content editing system 100 according to this embodiment.

As shown in FIG. 3, the multimedia content editing system 100 includes the editing server 101 and terminals 102, 103, . . . . The editing server 101 and the terminals 102, 103, . . . are connected via a network or the like.

Figure 4:
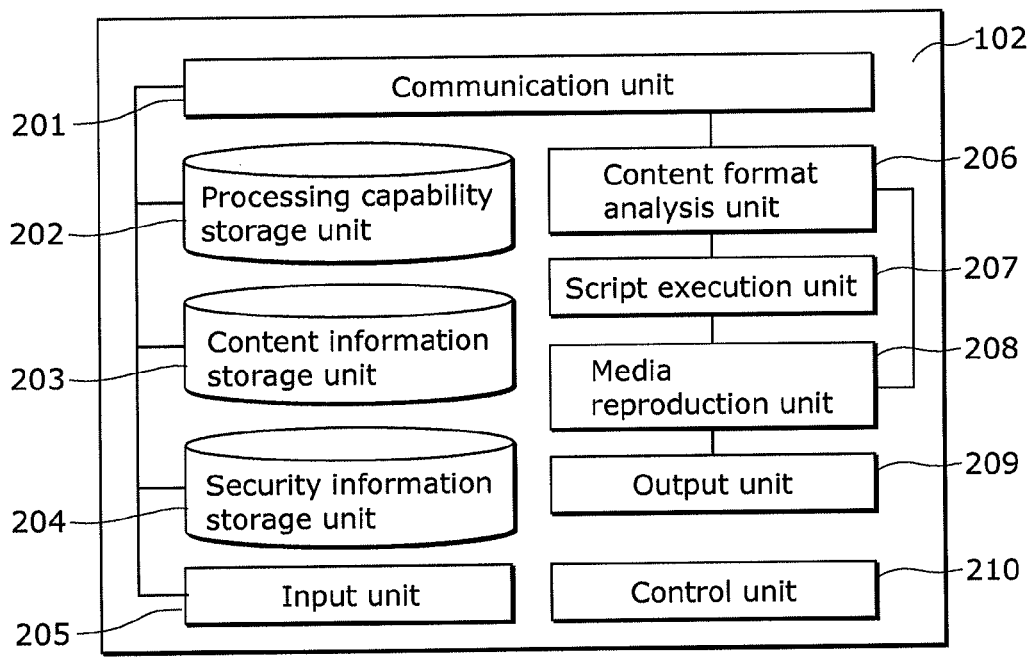
FIG. 4 is a block diagram showing a structure of a terminal according to the embodiment.
Figures 5, 6:
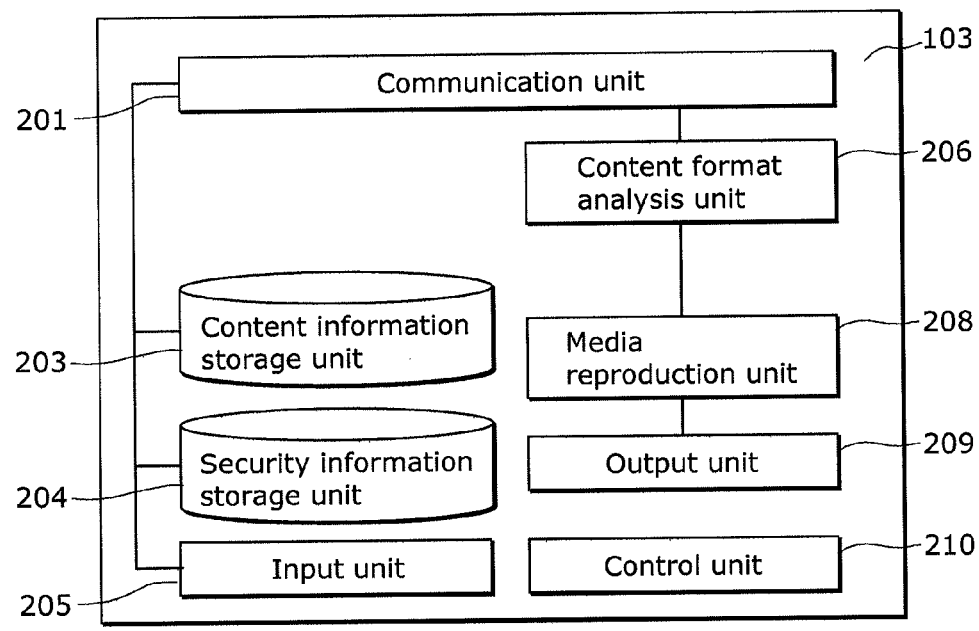
FIG. 5 is a block diagram showing a structure of a terminal according to the embodiment.
FIG. 6 is a diagram showing an example of data stored in a processing capability storage unit according to the embodiment.

FIG. 4 is a block diagram showing a structure of the terminal 102. FIG. 5 is a block diagram showing a structure of the terminal 103. The terminal 102 is used both for editing multimedia content in the material package format and for reproducing multimedia content in the material package format. The terminal 103 is used both for editing multimedia content in the material package format and for reproducing multimedia content in the complete package format.

For convenience's sake, a terminal is also referred to as "editing terminal" when being used for editing multimedia content and "reproduction terminal" when being used for reproducing multimedia content (in the material package format or the complete package format).

The terminal 102 includes a communication unit 201, a processing capability storage unit 202, a content information storage unit 203, a security information storage unit 204, an input unit 205, a content format analysis unit 206, a script execution unit 207, a media reproduction unit 208, an output unit 209, and a control unit 210.

The structural elements included in the terminal 102 are described below.

The communication unit 201 has a function of transmitting a command indicating a process and a parameter associated with the command to the editing server 101, and receiving response data corresponding to the command from the editing server 101. For example, the communication unit 201 is a communication circuit realized by a network interface circuit or the like.

The processing capability storage unit 202 has a function of storing version information of the script execution unit 207 and processing capability information of the script execution unit 207. For example, the processing capability storage unit 202 is a memory device realized by a flash memory or the like.

FIG. 6 is a diagram showing an example of data stored in the processing capability storage unit 202. The processing capability storage unit 202 stores a script processing capability table 301 including version information 302 and script processing capability information 303.

The version information 302 is information indicating the version of the script execution unit 207. For example, the version information 302 is written to the processing capability storage unit 202 upon factory shipment, and updated as the script execution unit 207 is updated. Here, an initial version "1.0.0" is stored as the version information 302.

The script processing capability information 303 indicates a value that is determined according to the operation clock, memory size, bus speed, and the like of the terminal 102 and normalized to a numeric value from 1 to 100. A larger numeric value represents a higher script processing capability. For example, the script processing capability information 303 is written to the processing capability storage unit 202 upon factory shipment.

The version information 302 and the script processing capability information 303 need not necessarily be the above-mentioned data, and any data may be used so long as the version and the script processing capability can be identified. As an example, the number of updates of the terminal 102 may be used as the version information 302, and the lot number, product number, serial number, or the like of the terminal 102 may be used as the script processing capability information 303.

The content information storage unit 203 has a function of storing multimedia content edited by the user of the terminal 102. For example, the content information storage unit 203 is a memory device realized by a hard disk drive (HDD) or the like. The multimedia content edited by the user may be stored in the terminal 102, or stored in the editing server 101, the user's library server (not shown), or the like. In the case where the multimedia content is stored in the editing server 101, the content information storage unit 203 stores information for identifying the editing server as the storage destination and information for uniquely identifying each component included in the multimedia content such as a photograph, video, and a media control script.

FIG. 7 is a diagram showing an example of data stored in the content information storage unit 203. The content information storage unit 203 stores a content information table 311 including a multimedia content storage location 312, an editor ID 313, a template ID 314, a theme ID 315, and a material table ID 316.

The multimedia content storage location 312 indicates a file path in the HDD, in the case where the multimedia content is stored in the terminal 102. In the case where the multimedia content is stored in the editing server 101 or another server, on the other hand, the multimedia content storage location 312 indicates an identifier of the server and a file path in the server. Though the URL (Uniform Resource Locator) format is used for the multimedia content storage location 312 here, the multimedia content storage location 312 need not necessarily be in this format, and any data format may be used so long as the storage location can be identified.

The editor ID 313 is a user ID registered in the editing server 101 by the user. The editing server 101 may assign the user ID to the user.

A predetermined combination of BGM, a decoration image (or decoration images), and a media control script is referred to as "template". Registering a frequently used material combination in the editing server 101 as a template saves the need to select individual materials when editing multimedia content.

The user may also purchase a template from a template selling service and register the template. In the case where a template is used to edit the multimedia content, the identifier of the template used is stored as the template ID 314. Though the format including a template editor name and an identifier is used for the template ID 314 here, the template ID 314 need not necessarily be in this format. In the case where no template is designated, a null value "Null" is stored as the template ID 314.

A group of templates that give the same impression or are recognized as the same type is referred to as "theme". By designating a theme, the user does not need to select individual materials and templates when editing the multimedia content. In the case where a theme is designated to edit the multimedia content, the identifier of the theme used is stored as the theme ID 315. Though the 4-digit number format is used for the theme ID 315 here, the theme ID 315 need not necessarily be in this format. In the case where no theme is designated, a null value "Null" is stored as the theme ID 315.

The material table ID 316 is an identifier for identifying a material table including photographs, video, BGM, one or more decoration images, and a media control script that are included in the multimedia content. Though the 4-digit number format is used for the material table ID 316 here, the material table ID 316 need not necessarily be in this format.

FIG. 8 is a diagram showing an example of data included in a material table 321. The material table 321 includes a material table ID 322, a material ID 323, a material type 324, and material data 325.

The material table ID 322 corresponds to the material table ID 316 included in the content information table 311, and is associated with the materials included in the multimedia content managed in the content information table 311.

The material ID 323 is an identifier for uniquely identifying material data. Though the format including an editor name and a 4-digit number is used for the material ID 323 here, the material ID 323 need not necessarily be in this format.

The material type 324 indicates the type and format of the material. Though the MIME (Multipurpose Internet Mail Extensions) format is used for the material type 324 here, the material type 324 need not necessarily be in this format.

The material data 325 is information indicating the material data. Though a file name is used for the material data 325 here, other identifiers may be used so long as the material can be uniquely identified.

The security information storage unit 204 has a function of storing the security level of the terminal 102. For example, the security information storage unit 204 is a memory device realized by a flash memory or the like. The security level is information indicating whether or not the terminal 102 has an unauthorized use prevention function for multimedia content. The unauthorized use prevention function includes, for example, a function of encrypting and protecting the data stored in the content information storage unit 203 in the terminal 102, a function of verifying that the editor of the media control script included in the multimedia content is a valid editor, and a function of verifying that the media control script included in the multimedia content has not been tampered with. In the case where the terminal 102 has the unauthorized use prevention function, "1" is stored in the security information storage unit 204. In the case where the terminal 102 does not have the unauthorized use prevention function, "0" is stored in the security information storage unit 204.

The data of the security level is written to the security information storage unit 204 upon factory shipment, and subsequently protected from unauthorized alteration. For instance, the security information storage unit 204 is realized by a flash memory in a processor, thus preventing user access. Moreover, the security level may be expressed not in two levels, but in three or more levels according to the function of the terminal 102. The information stored in the security information storage unit 204 may be data in any format, so long as the security level can be identified. For example, the information may be the lot number, product number, serial number, or the like of the terminal 102.

The input unit 205 has a function of the terminal 102 receiving an instruction or an operation from the user. For example, the input unit 205 is an input circuit realized by a keyboard, a touch panel, a remote control, or the like.

The content format analysis unit 206 has a function of analyzing the format of the multimedia content. For example, the content format analysis unit 206 is a stream format decoder circuit.

The script execution unit 207 has a function of executing the media control script included in the multimedia content. For example, the script execution unit 207 is a virtual machine circuit.

The media reproduction unit 208 has a function of reproducing the media data such as photographs and video included in the multimedia content. For example, the media reproduction unit 208 is a JPEG (Joint Photographic Experts Group) decoder or MPEG decoder realized by software or hardware.

The output unit 209 has a function of displaying a screen for receiving an instruction or an operation from the user, a function of displaying the result of reception from the editing server 101, and a function of displaying the processing result of the terminal 102. For example, the output unit 209 is a display or a display output interface.

The control unit 210 is an electronic circuit that controls the structural elements included in the terminal 102.

The structural elements included in the terminal 103 are described below.

FIG. 5 is a block diagram showing the structure of the terminal 103. The terminal 103 reproduces multimedia content in the complete package format. Hence, the terminal 103 does not have the media control script-related functions, as compared with the terminal 102. In detail, the terminal 103 does not include the processing capability storage unit 202 and the script execution unit 207 included in the terminal 102. The other structural elements are the same as those in the terminal 102, and so their description is omitted.

The structural elements included in the editing server 101 are described below.

Figure 9:
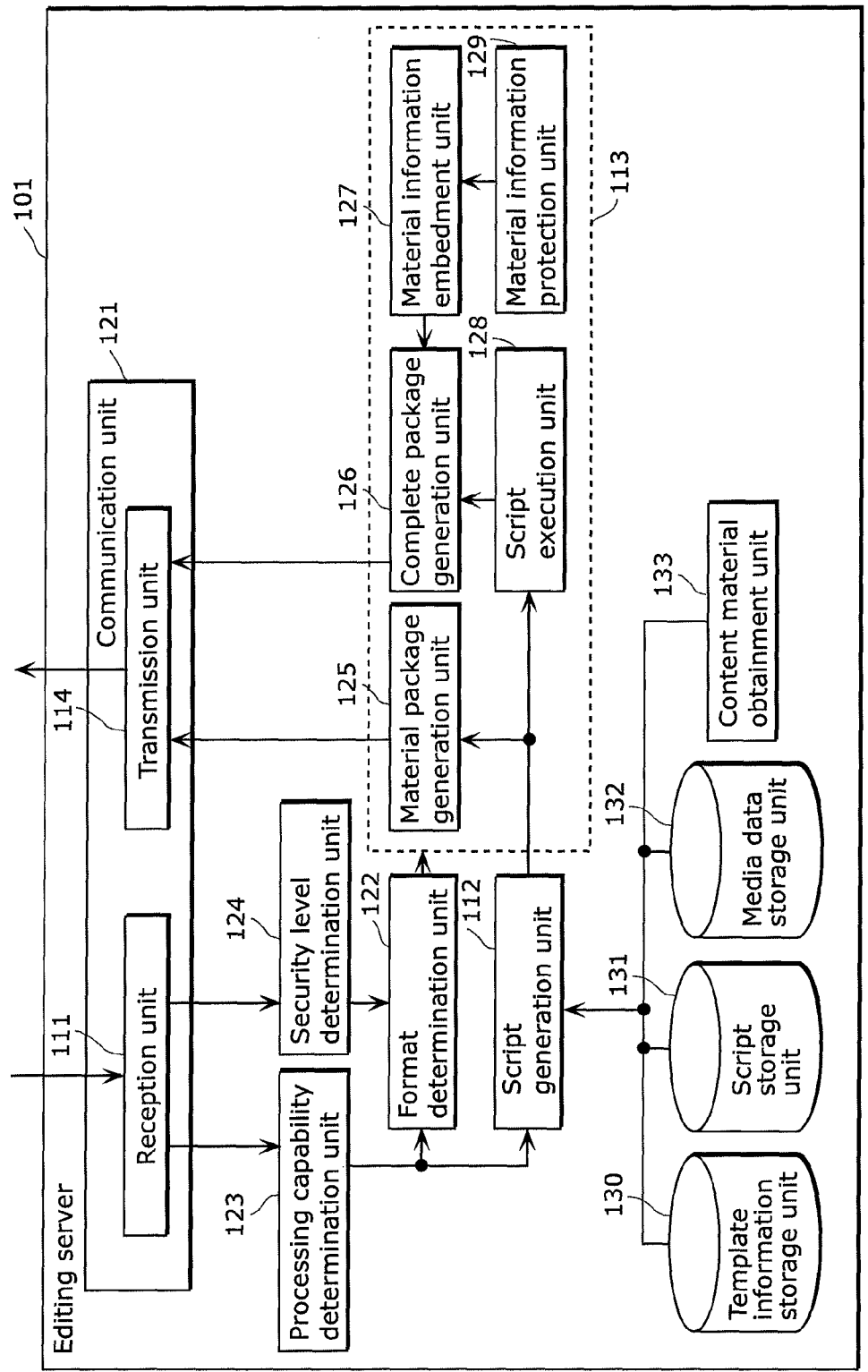
FIG. 9 is a block diagram showing a structure of an editing server according to the embodiment.

FIG. 9 is a block diagram showing the structure of the editing server 101.

The editing server 101 includes a communication unit 121, a format determination unit 122, a processing capability determination unit 123, a security level determination unit 124, a template information storage unit 130, a script storage unit 131, a media data storage unit 132, a content material obtainment unit 133, the script generation unit 112, and the multimedia content generation unit 113.

The communication unit 121 includes the reception unit 111 and the transmission unit 114. The multimedia content generation unit 113 includes a material package generation unit 125, a complete package generation unit 126, a material information embedment unit 127, a script execution unit 128, and a material information protection unit 129.

The following describes each of the structural elements included in the editing server 101.

The communication unit 121 receives a command and a parameter associated with the command from any of the terminals 102, 103, . . . , and transmits response data corresponding to the command to the corresponding one of the terminals 102, 103, . . . . The communication unit 121 also communicates with a material server (not shown) designated by the user, to obtain materials used for multimedia content. For example, the communication unit 121 is a communication circuit realized by a network interface circuit or the like.

The format determination unit 122 is an electronic circuit that selects the format of the multimedia content to be generated, according to one or both of the processing capability information and the security level received by the communication unit 121. The selected content format is either the material package format or the complete package format.

The processing capability determination unit 123 is an electronic circuit that analyzes the processing capability information received by the communication unit 121, and provides information indicating whether or not the terminal has the script execution unit and script processing capability information to the format determination unit 122.

The security level determination unit 124 is an electronic circuit that analyzes the security level received by the communication unit 121, and provides information indicating whether or not the terminal has the unauthorized use prevention function for multimedia content to the format determination unit 122.

The material package generation unit 125 is an electronic circuit that generates, edits, and reconfigures material package multimedia content (i.e. multimedia content in the material package format) according to an instruction from the format determination unit 122.

The complete package generation unit 126 is an electronic circuit that generates, edits, and reconfigures complete package multimedia content (i.e. multimedia content in the complete package format) according to an instruction from the format determination unit 122.

The script generation unit 112 is an electronic circuit that selects, generates, and processes a media control script included in the material package multimedia content and a media control script used for generating the complete package multimedia content.

The script execution unit 128 is an electronic circuit that executes the media control script provided from the script generation unit 112 in a virtual machine, upon generating the complete package multimedia content.

The material information embedment unit 127 is an electronic circuit that embeds the identifiers of the media data such as photographs and video and the media control script used for generating the multimedia content and the identifier of the multimedia content, in the generated multimedia content. With the use of the identifiers of the materials, the editing server 101 and the terminal 102 can identify the materials to be edited when re-editing the multimedia content. With the use of the identifier of the multimedia content, the editing server 101 and the terminal 102 can track the sharer in the case where the multimedia content is shared.

The template information storage unit 130 has a function of storing scripts used for multimedia content, and is realized by an HDD or the like.

FIG. 10 is a diagram showing an example of a template table 331 stored in the template information storage unit 130. The template table 331 includes a template ID 332, a template name 333, a theme ID 334, a theme name 335, a material table ID 336, and a template thumbnail 337.

The template ID 332 is an identifier for uniquely identifying a template. Though the format including a template editor name and an identifier is used for the template ID 332 here, the template ID 332 need not necessarily be in this format.

The template name 333 is the name of the template. Presenting the template name 333 to the user enables the user to easily select the template when editing the multimedia content.

The theme ID 334 is an identifier for uniquely identifying a theme to which the template belongs. Though the 4-digit number format is used for the theme ID 334 here, the theme ID 334 need not necessarily be in this format. Moreover, the template need not necessarily belong to a theme. In the case where the template does not belong to any theme, a null value "Null" is stored as the theme ID 334.

The theme name 335 is the name of the theme. By designating the theme when editing the multimedia content, the user does not need to select individual materials and templates. In the case where the template does not belong to any theme, a null value "Null" is stored as the theme name 335.

The material table ID 336 is an identifier for identifying a material table including BGM, decoration images, and a media control script that are included in the template. Though the 4-digit number format is used for the material table ID 336 here, the material table ID 336 need not necessarily be in this format.

The template thumbnail 337 is a thumbnail image indicating the template. Though the URL format is used for the template thumbnail 337 here, other formats may be used so long as the material can be uniquely identified.

FIG. 11 is a diagram showing an example of data included in a material table 341. The material table 341 includes a material table ID 342, a material ID 343, a material type 344, and material data 345.

The material table ID 342 corresponds to the material table ID 336 included in the template table 331, and is associated with a material included in the template managed in the template table 331.

The material ID 343 is an identifier for uniquely identifying the material data. Though the format including an editor name and a 4-digit number is used for the material ID 343 here, the material ID 343 need not necessarily be in this format.

The material type 344 is information indicating the type and format of the material. Though the MIME (Multipurpose Internet Mail Extensions) format is used for the material type 344 here, the material type 344 need not necessarily be in this format.

The material data 345 is information indicating the material data. Though the URL format is used for the material data 345 here, other formats may be used so long as the material can be uniquely identified.

The script storage unit 131 has a function of storing scripts used for editing multimedia content, and is realized by a HDD or the like.

FIG. 12 is a diagram showing an example of a script table 351 stored in the script storage unit 131. The script table 351 includes a material ID 352 and script data 353.

The material ID 352 is an identifier unique to a media control script. Though the 5-digit alphanumeric format is used for the material ID 352 here, the material ID 352 need not necessarily be in this format.

The script data 353 indicates a file path in the HDD, in the case where the script is stored in the editing server 101. In the case where the script is stored in another server, on the other hand, the script data 353 indicates an identifier of the server and a file path in the server. Though the URL format is used for the script data 353 here, the script data 353 need not necessarily be in this format, and any data format may be used so long as the storage location can be identified.

The media data storage unit 132 has a function of storing media data such as photographs and video used for editing multimedia content, and is realized by a HDD or the like.

FIG. 13 is a diagram showing an example of a media data table 361 stored in the media data storage unit 132. The media data table 361 includes a material ID 362, a material type 363, and material data 364.

The material ID 362 is an identifier for uniquely identifying material data. Though the format including an editor name and a 4-digit number is used for the material ID 362 here, the material ID 362 need not necessarily be in this format.

The material type 363 indicates the type and format of the material. Though the MIME format is used for the material type 363 here, the material type 363 need not necessarily be in this format.

The material data 364 is information indicating the material data. Though the URL format is used for the material data 364 here, other formats may be used so long as the material can be uniquely identified.

The content material obtainment unit 133 is an electronic circuit that, in the case where user materials used for generating and editing multimedia content are present in an external server other than the editing server 101, relays authentication between the external server and the user, and obtains the user materials from the external server in the case where the authentication is successful.

The material information embedment unit 127 embeds material information including: information of the media data such as photographs and BGM used for generating the complete package multimedia content; information of the media control script used for generating the complete package multimedia content; and information of the multimedia content, in the multimedia content.

The material information protection unit 129 protects the material information. The material information is protected in order to prevent unauthorized copying and unauthorized replacement of the materials identified by the material information. Thus, the materials of the user editing the multimedia content are protected from being obtained by any other user, and the materials of any other user are protected from being obtained by the user editing the multimedia content. Moreover, in the case where the multimedia content is shared, the material information also serves as sharer tracking information. Therefore, protecting the material information can also prevent unauthorized replacement of the tracking information.

The following describes various operations in the multimedia content editing system 100 having the above structure, in detail.

Figure 14:
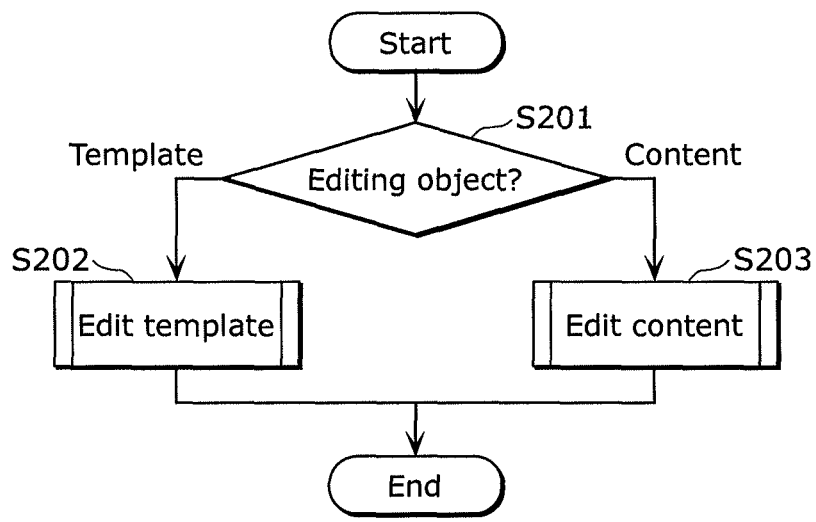
FIG. 14 is a flowchart showing process flow of a multimedia content editing system according to the embodiment.

FIG. 14 is a flowchart showing process flow of the multimedia content editing system 100 according to this embodiment. In the following description of the multimedia content editing process, processes common to the terminal 102 and the terminal 103 are described as processes in the terminal 102, and processes different between the terminal 102 and the terminal 103 are described separately.

(Step S201)

In this step, the terminal 102 receives input of a multimedia content process.

Figure 15:
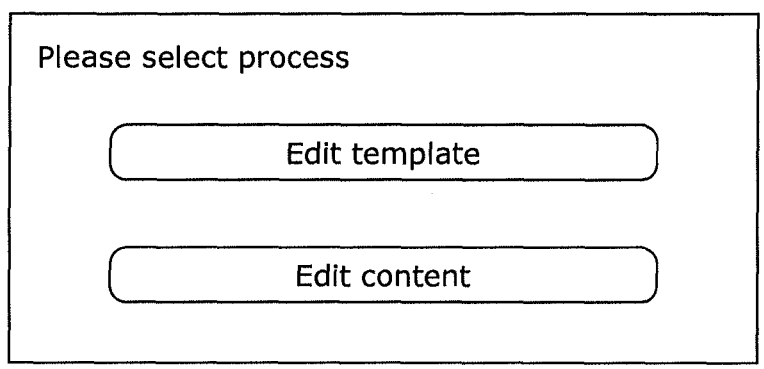
FIG. 15 is a diagram showing an example of a multimedia content editing process selection screen according to the embodiment.

The control unit 210 in the terminal 102 outputs a multimedia content editing process selection screen shown in FIG. 15, via the output unit 209. Two editing methods, namely, "edit template" and "edit content", are available as shown in FIG. 15.

In the method "edit template", the user selects a decoration image, BGM, and a reproduction effect used for a template, and edits the template.

In the method "edit content", the user selects a theme, a template, and materials of multimedia content and media data of the user, and edits the multimedia content.

The user selects an editing method using a mouse, a keyboard, a remote control, or the like. The control unit 210 identifies the editing method selected by the user via the input unit 205.

(Step S202)

In the case where template editing is selected (Step S201: template), the template editing process is performed. The process will be described in detail later.

(Step S203)

In the case where content editing is selected (Step S201: content), the content editing process is performed. The process will be described in detail later.

(Template Editing Process)

The template editing process is described first.

Figure 16A:
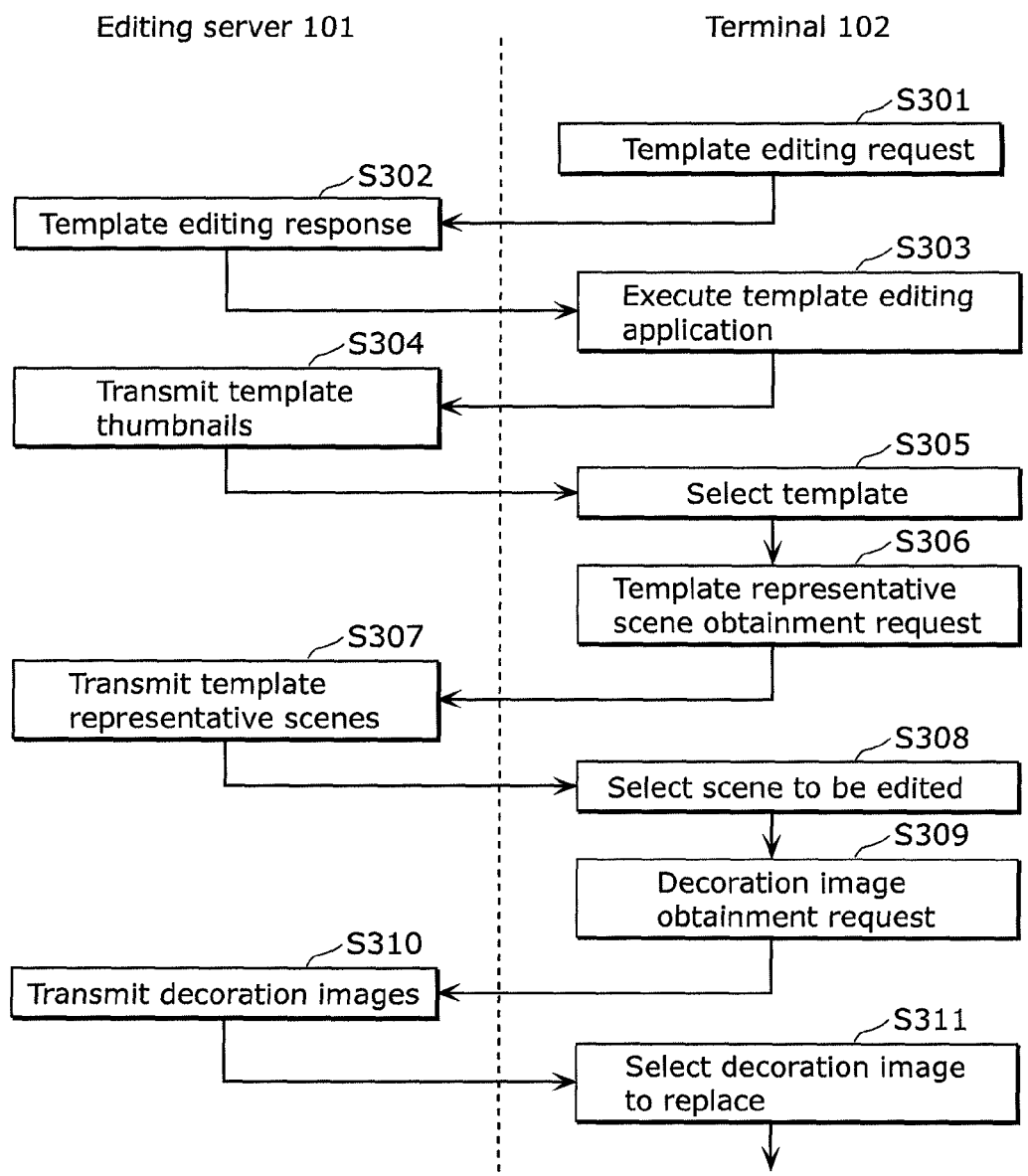
FIG. 16A is a flowchart showing flow of a template editing process according to the embodiment.
Figure 16B:
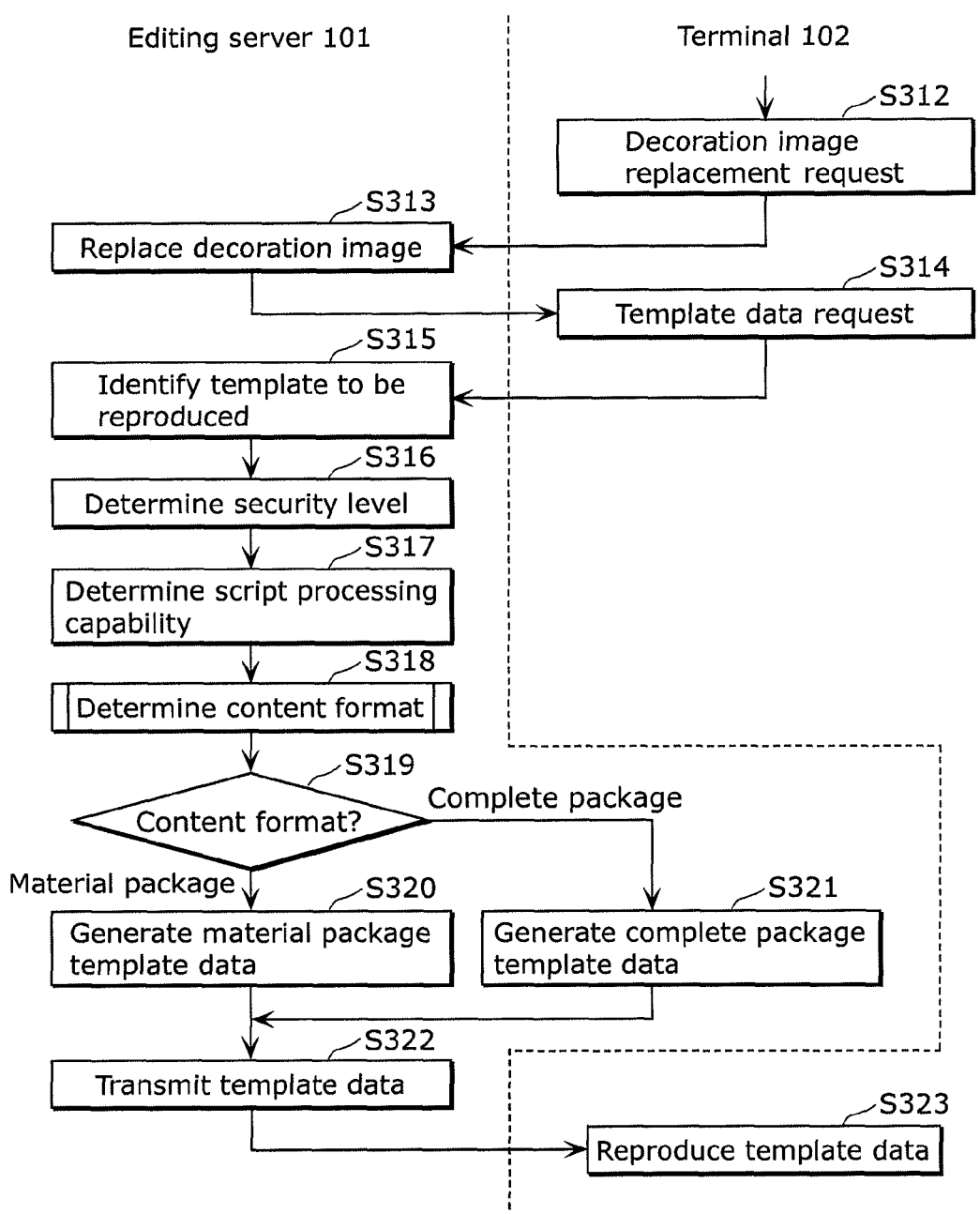
FIG. 16B is a flowchart showing flow of a template editing process according to the embodiment.

FIGS. 16A and 16B are flowcharts showing flow of the template editing process. The template editing process is described below, with reference to FIGS. 16A and 16B. It is assumed here that user authentication using the user ID and a password has been completed before the template editing process starts.

(Step S301)

In this step, the terminal 102 makes a template editing request to the editing server 101.

Figure 17:
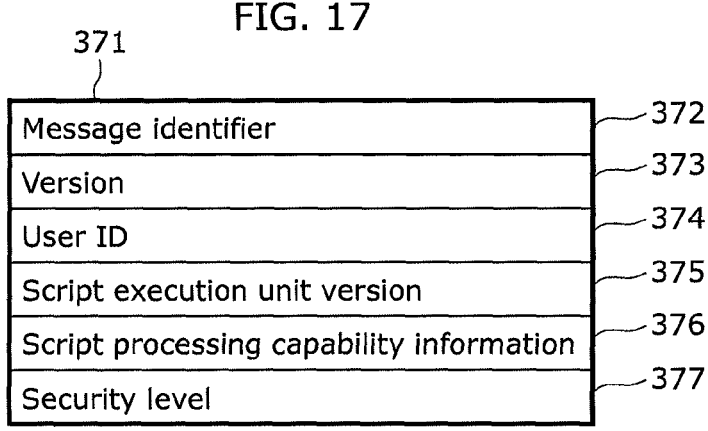
FIG. 17 is a diagram showing message data included in a template editing request message according to the embodiment.

The control unit 210 in the terminal 102 transmits a template editing request message to the editing server 101 via the communication unit 201. FIG. 17 is a diagram showing message data included in a template editing request message 371. The template editing request message 371 includes a message identifier 372, a version 373, a user ID 374, a script execution unit version 375, script processing capability information 376, and a security level 377 as message data.

The message identifier 372 is message data for identifying the message transmitted/received between the terminal 102 and the editing server 101. The version 373 is message data for identifying the version number of the message. The user ID 374 is message data for identifying the user who performs template editing, and is the user ID input by the user via the input unit 205 upon the user authentication completed beforehand. The script execution unit version 375 is message data for identifying the version of the script execution unit 207 in the terminal. The script processing capability information 376 is a numeric value indicating the script processing capability of the terminal. The security level 377 is a numeric value indicating the security level of the terminal. The security level is an integer from 1 to 10. A larger integer represents a higher security level.

Upon generating the template editing request message 371, the control unit 210 sets the message identifier 372 to "0001" indicating the template editing request message, the version 373 to "0100" indicating the initial version, and the user ID 374 to the user ID "KM".

The control unit 210 also sets the script execution unit version 375 to the value of the version information 302 stored in the processing capability storage unit 202, and the script processing capability information 376 to the value of the script processing capability information 303 stored in the processing capability storage unit 202. In the case where the terminal has no script execution unit (the terminal 103), the control unit 210 sets the script execution unit version 375 and the script processing capability information 376 to a null value "0".

The control unit 210 further sets the security level 377 to the value stored in the security information storage unit 204.

The control unit 210 transmits the generated template editing request message 371 to the editing server 101 via the communication unit 201.

(Step S302)

In this step, the editing server 101 makes a template editing response.

Figure 18:
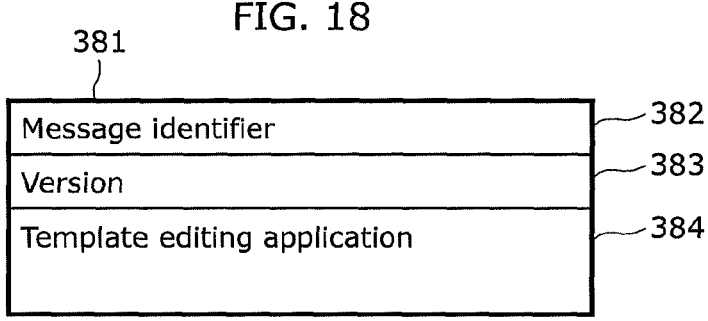
FIG. 18 is a diagram showing message data included in a template editing response message according to the embodiment.

Having received the template editing request message 371, the communication unit 121 in the editing server 101 transmits a template editing response message to the terminal 102. FIG. 18 is a diagram showing message data included in a template editing response message 381. The template editing response message 381 includes a message identifier 382, a version 383, and a template editing application 384 as message data. In this embodiment, an application program is referred to as "application".

The message identifier 382 is message data for identifying the message transmitted/received between the terminal 102 and the editing server 101. The version 383 is message data for identifying the version number of the message. The template editing application 384 is a template editing application program executed in the terminal 102. The template editing application may directly run in the terminal 102, or run in a browser in the terminal 102.

Upon generating the template editing response message 381, the communication unit 121 sets the message identifier 382 to "0002" indicating the template editing response message, the version 383 to "0100" indicating the initial version, and the template editing application 384 to the template editing application stored in an application storage unit (not shown) in the editing server 101. The communication unit 121 transmits the generated template editing response message to the terminal 102.

(Step S303)

In this step, the terminal 102 executes the template editing application.

The template editing application directly runs in the terminal 102 or runs in the browser in the terminal 102, and outputs a template editing screen via the output unit 209. Template editing is a function of generating a new template based on a template prepared beforehand or a template previously generated by the user.

Figure 19:
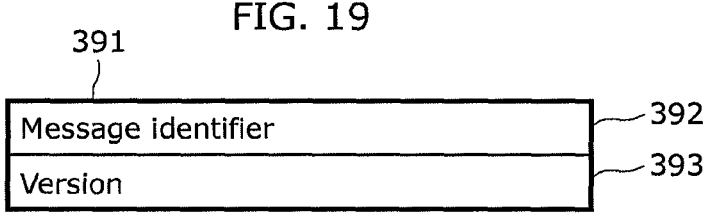
FIG. 19 is a diagram showing message data included in a template thumbnail request message according to the embodiment.

When executed by the terminal 102, the template editing application transmits a template thumbnail request message to the editing server 101 via the communication unit 201. FIG. 19 is a diagram showing message data included in a template thumbnail request message 391. The template thumbnail request message 391 includes a message identifier 392 and a version 393 as message data.

The message identifier 392 is message data for identifying the message transmitted/received between the terminal 102 and the editing server 101. The version 393 is message data for identifying the version number of the message.

Upon generating the template thumbnail request message 391, the template editing application sets the message identifier 392 to "0003" indicating the template thumbnail request message, and the version 393 to "0100" indicating the initial version. The template editing application transmits the generated template thumbnail request message 391 to the editing server 101 via the communication unit 201.

(Step S304)

In this step, the editing server 101 transmits requested template thumbnails to the terminal 102.

Having received the template thumbnail request message 391, the communication unit 121 in the editing server 101 generates a template thumbnail response message using the information of the template thumbnails 337 of all templates included in the template table 331 stored in the template information storage unit 130.

Figure 20:
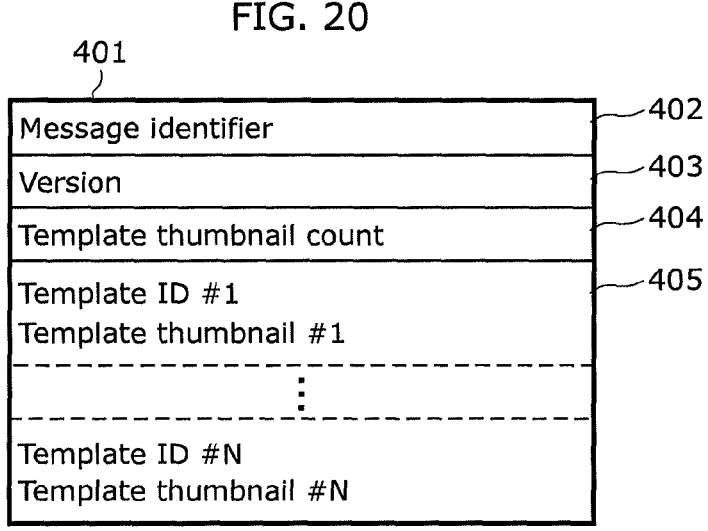
FIG. 20 is a diagram showing message data included in a template thumbnail response message according to the embodiment.

FIG. 20 is a diagram showing message data included in a template thumbnail response message 401. The template thumbnail response message 401 includes a message identifier 402, a version 403, a template thumbnail count 404, and template thumbnails 405 as message data.

The message identifier 402 is message data for identifying the message transmitted/received between the terminal 102 and the editing server 101. The version 403 is message data for identifying the version number of the message. The template thumbnail count 404 is the number of template thumbnails included in the template thumbnails 405. The template thumbnails 405 each include a template ID and template thumbnail data, and are successively stored for the number of template thumbnails indicated by the template thumbnail count 404.

Upon generating the template thumbnail response message 401, the communication unit 121 performs the following process.

The communication unit 121 sets the message identifier 402 to "0004" indicating the template thumbnail response message, and the version 403 to "0100" indicating the initial version.

The communication unit 121 also searches the template table 331 stored in the template information storage unit 130, to obtain the number of templates included in the template table 331. In the example shown in FIG. 10, the number of templates included in the template table 331 is 4.

The communication unit 121 further obtains the template ID and thumbnail data of each template included in the template table 331. The communication unit 121 obtains the template ID of each template, by referring to the template ID 332 in the template table 331. The communication unit 121 obtains the thumbnail data of each template, by referring to the template thumbnail 337 in the template table 331. For instance, in the case of referring to the thumbnail data of the template whose template ID 332 is "PM0001" in the example shown in FIG. 10, the communication unit 121 first obtains the URL "file://tn/pm0001.jpg" indicated by the template thumbnail 337. The communication unit 121 then accesses the URL "file://tn/pm0001.jpg", to obtain the thumbnail data. In the case where the URL indicated by the template thumbnail 337 corresponds to an external server other than the editing server 101, the communication unit 121 may perform user authentication using the user ID and the password before obtaining the thumbnail data from the external server via the content material obtainment unit 133. The communication unit 121 may also apply encryption to communication between the editing server and the external server, for template data protection.

After this, the communication unit 121 sets the template thumbnail count 404 to "4", and the template thumbnails 405 to the four combinations of template IDs and template thumbnail data in sequence.

The communication unit 121 transmits the generated template thumbnail response message 401 to the terminal 102.

(Step S305)

In this step, the user selects a template used for template editing.

Figure 21:
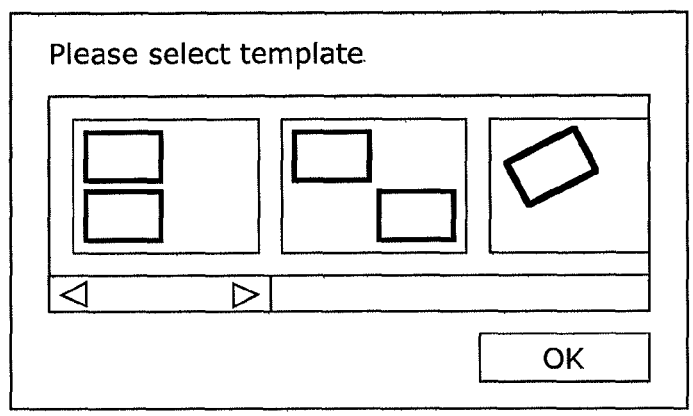
FIG. 21 is a diagram showing an example of a template editing screen according to the embodiment.

Having received the template thumbnail response message 401, the terminal 102 displays a template editing screen shown in FIG. 21. Here, the terminal 102 outputs the screen via the output unit 209. The terminal 102 displays the template thumbnail data included in the received template thumbnail response message 401, on the template editing screen as the template thumbnails.

The user selects a template as a basis for generation, from the template editing screen shown in FIG. 21. The template is selected via the input unit 205. Having selected the template, the user presses the OK button.

(Step S306)

In this step, the terminal 102 makes a template representative scene request to the editing server 101, for the template selected in Step S305.

A representative scene of a template is an image representative of the scenes included in the template. The user edits one or more individual representative scenes, thereby editing the entire template.

Figure 22:
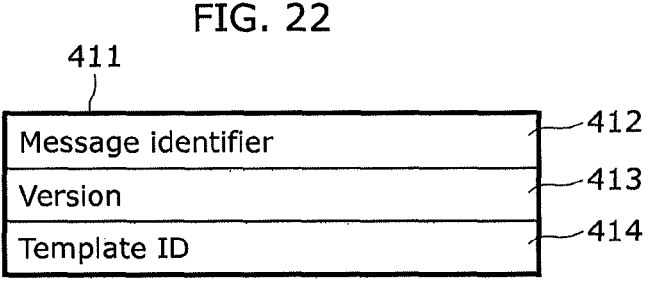
FIG. 22 is a diagram showing message data included in a template representative scene request message according to the embodiment.

The template editing application transmits a template representative scene request message to the editing server 101 via the communication unit 201. FIG. 22 is a diagram showing message data included in a template representative scene request message 411. The template representative scene request message 411 includes a message identifier 412, a version 413, and a template ID 414 as message data.

The message identifier 412 is message data for identifying the message transmitted/received between the terminal 102 and the editing server 101. The version 413 is message data for identifying the version number of the message. The template ID 414 is the template ID corresponding to the template selected by the user in Step S305.

Upon generating the template representative scene request message 411, the template editing application sets the message identifier 412 to "0005" indicating the template representative scene request message, the version 413 to "0100" indicating the initial version, and the template ID 414 to the template ID selected by the user. Suppose the template ID is "PM0001" in this example. The template editing application transmits the generated template representative scene request message 411 to the editing server 101 via the communication unit 201.

(Step S307)

In this step, the editing server 101 transmits requested template representative scenes to the terminal 102.

Having received the template representative scene request message 411, the communication unit 121 in the editing server 101 extracts the value of the template ID 414 in the received template representative scene request message 411.

The communication unit 121 then obtains the material data of the template corresponding to the extracted template ID. In detail, the communication unit 121 first searches the template table 331 stored in the template information storage unit 130, for the material table ID 336 corresponding to the template ID 332. In this example, the material table ID "3628" corresponding to the template ID "PM0001" included in the template representative scene request message 411 is searched for. The communication unit 121 also searches the material table 341 stored in the template information storage unit 130, for the material data 345 corresponding to the searched-for material table ID 342. In this example, the decoration images "file://decorations/cake001.jpg" and "file://decorations/cake001.jpg", the BGM "file://BGMs/birthday.mp3", and the media control script "file://scripts/happy.js" which are the material data corresponding to the material table ID "3628" are searched for.

The communication unit 121 then obtains the searched-for material data from the script storage unit 131 and the media data storage unit 132, and executes the media control script in the script execution unit 128.

The script execution unit 128 executes the media control script, to generate the template representative scenes. In detail, the script execution unit 128 performs the following process. The script execution unit 128 executes the media control script. When the media control script obtains and draws a decoration image during reproduction of the template, the script execution unit 128 extracts a time code (relative time from the start in template reproduction) at the time of drawing, a material ID corresponding to the decoration image, and a frame.

In more detail, the script execution unit 128 performs the following process. Upon executing a decoration image file drawing instruction in the media control script, the script execution unit 128 encodes the drawn template to a JPEG image, and extracts the encoding result as a template representative scene file. When doing so, the script execution unit 128 stores the template ID, the material ID, and the time code in a database in the editing server, as file information. The template representative scene generation is performed each time the media control script draws a decoration image. Note that the method of storing the template representative scene, the material ID, and the time code is not limited to this.

The editing server 101 may store the template representative scenes generated once, for subsequent use in response to a template representative scene request message designating the same template. This contributes to higher responsiveness of the editing server 101. Moreover, the editing server 101 may perform the template representative scene generation in advance, when the template is registered in the editing server 101.

Figure 23:
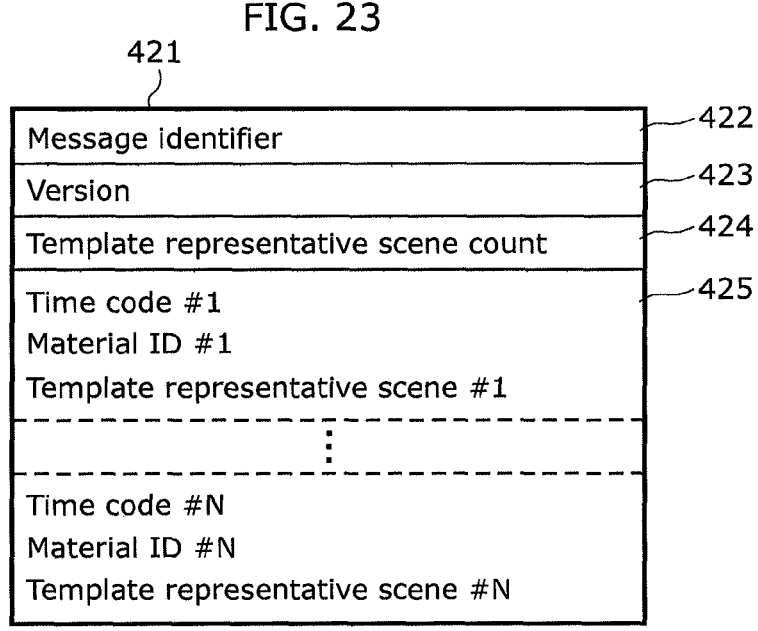
FIG. 23 is a diagram showing message data included in a template representative scene response message according to the embodiment.

Lastly, the communication unit 121 transmits a template representative scene response message to the terminal 102. FIG. 23 is a diagram showing message data included in a template representative scene response message 421. The template representative scene response message 421 includes a message identifier 422, a version 423, a template representative scene count 424, and template representative scenes 425 as message data.

The message identifier 422 is message data for identifying the message transmitted/received between the terminal 102 and the editing server 101. The version 423 is message data for identifying the version number of the message. The template representative scene count 424 is the number of template representative scenes included in the template representative scenes 425. The template representative scenes 425 each include a time code and template representative scene data, and are successively stored for the number of template representative scenes indicated by the template representative scene count 424.

Upon generating the template representative scene response message 421, the communication unit 121 performs the following process.

The communication unit 121 sets the message identifier 422 to "0006" indicating the template representative scene response message, and the version 423 to "0100" indicating the initial version.

The communication unit 121 also sets the template representative scene count 424 to the number of generated template representative scenes. The communication unit 121 further sets the template representative scenes 425 to the generated template representative scene data, the time codes, and the material IDs. The communication unit 121 transmits the generated template representative scene response message 421 to the terminal 102.

(Step S308)

In this step, the user selects a scene to be edited, for the template selected in Step S305.

Figure 24:
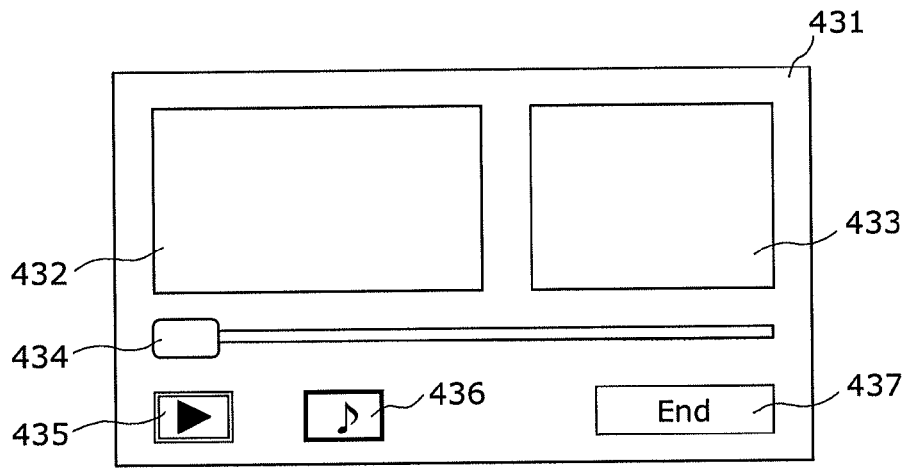
FIG. 24 is a diagram showing an example of a template editing screen according to the embodiment.

FIG. 24 is a diagram showing an example of a template editing screen. A template editing screen 431 includes a scene display area 432, a material display area 433, a slide bar 434 for selecting a representative scene in the template, a play button 435, a BGM change button 436, and an end button 437.

A representative scene in the template selected by the user in Step S305 and an edited template are displayed in the scene display area 432. An editable material in the scene displayed in the scene display area 432 is displayed in the material display area 433.

Figure 25:
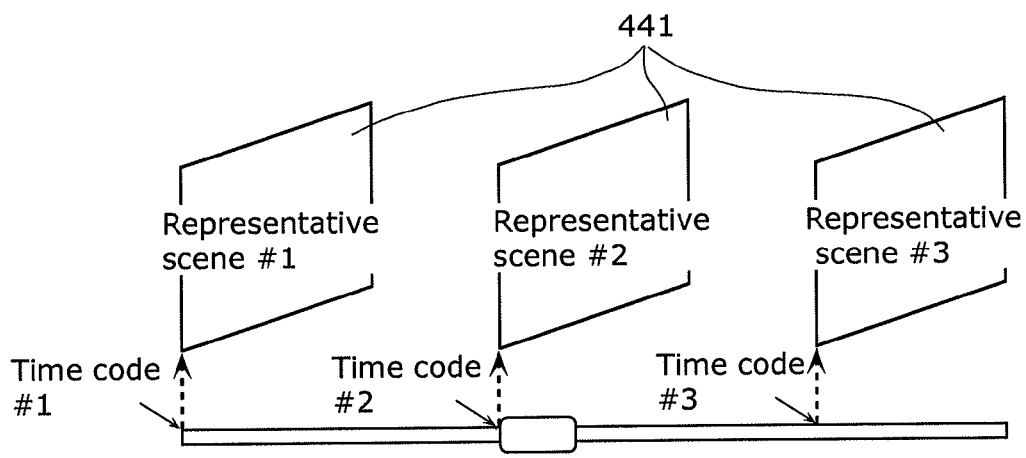
FIG. 25 is a diagram showing relations between time codes of a slide bar in a template editing screen and scenes in a template according to the embodiment.

Sliding the slide bar 434 to the right moves the time code forward, and sliding the slide bar 434 to the left moves the time code back. FIG. 25 is a diagram showing relations between time codes designated by the slide bar 434 and scenes in the template. In FIG. 25, representative scenes 441 are representative scenes included in the template in chronological order. The position of the slide bar 434 is associated with each representative scene 441 of the template, and the representative scene 441 of the template corresponding to the time code designated by the slide bar 434 is displayed in the scene display area 432.

In the example in FIG. 25, the time code between "time code #1" and "time code #2" corresponds to "representative scene #1", the time code between "time code #2" and "time code #3" corresponds to "representative scene #2", and the time code from "time code #3" corresponds to "representative scene #3".

Having received the template representative scene response message 421 via the communication unit 201, the template editing application displays each template representative scene included in the received template representative scene response message 421, in the scene display area 432. Here, the template editing application specifies the template representative scene corresponding to the position of the slide bar 434 using the time code corresponding to the template representative scene, and displays the specified template representative scene in the scene display area 432.

The user operates the slide bar 434, and selects the representative scene to be edited.

(Step S309)

In this step, the terminal 102 makes a request to obtain decoration images usable for replacement in the representative scene of the template, to the editing server 101.

Figure 26:
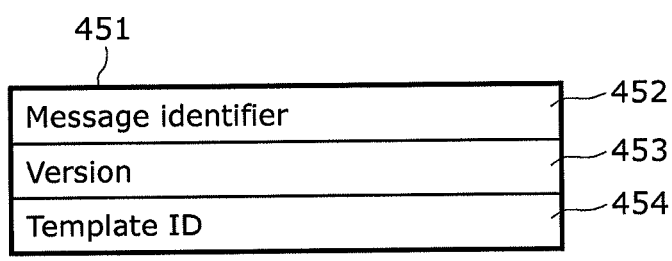
FIG. 26 is a diagram showing message data included in a decoration image request message according to the embodiment.

When the user operates the slide bar 434 and selects the representative scene to be edited in Step S308, the template editing application transmits a decoration image request message to the editing server 101 via the communication unit 201. FIG. 26 is a diagram showing message data included in a decoration image request message 451. The decoration image request message 451 includes a message identifier 452, a version 453, and a template ID 454 as message data.

The message identifier 452 is message data for identifying the message transmitted/received between the terminal 102 and the editing server 101. The version 453 is message data for identifying the version number of the message. The template ID 454 is the template ID corresponding to the template selected by the user in Step S305.

Upon generating the decoration image request message 451, the template editing application sets the message identifier 452 to "0007" indicating the decoration image request message, the version 453 to "0100" indicating the initial version, and the template ID 454 to the template ID selected by the user. Suppose the template ID is "PM0001" in this example. The template editing application transmits the generated decoration image request message 451 to the editing server 101 via the communication unit 201.

(Step S310)

In this step, the editing server 101 transmits requested decoration images to the terminal 102.

Having received the decoration image request message 451, the communication unit 121 in the editing server 101 searches for and obtains decoration images stored in the media data storage unit 132. In the case where usable decoration images are preset for each template, the communication unit 121 searches for and obtains decoration images usable in the template selected by the user, using the template ID included in the decoration image request message 451.

Figure 27:
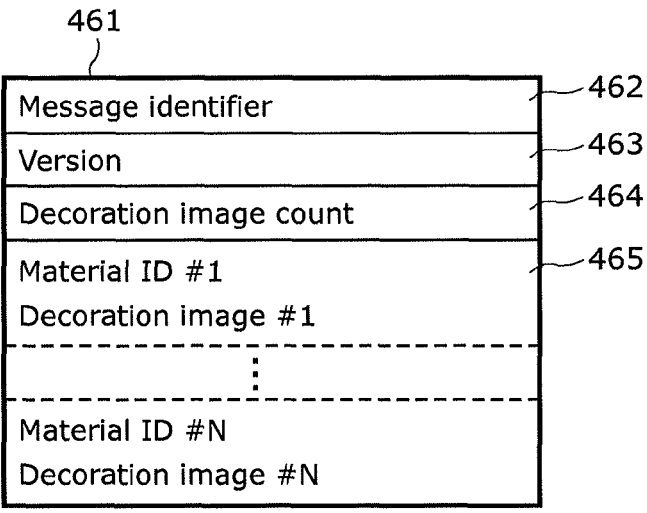
FIG. 27 is a diagram showing message data included in a decoration image response message according to the embodiment.

The communication unit 121 then transmits a decoration image response message to the terminal 102. FIG. 27 is a diagram showing message data included in a decoration image response message 461. The decoration image response message 461 includes a message identifier 462, a version 463, a decoration image count 464, and decoration images 465 as message data.

The message identifier 462 is message data for identifying the message transmitted/received between the terminal 102 and the editing server 101. The version 463 is message data for identifying the version number of the message. The decoration image count 464 is the number of template representative scenes included in the decoration images 465. The decoration images 465 each include a material ID and decoration image data, and are successively stored for the number of decoration images indicated by the decoration image count 464.

Upon generating the decoration image response message 461, the communication unit 121 performs the following process.

The communication unit 121 sets the message identifier 462 to "0008" indicating the decoration image response message, and the version 463 to "0100" indicating the initial version.

The communication unit 121 also sets the decoration image count 464 to the number of decoration images searched for and obtained from the media data storage unit 132. The communication unit 121 further sets the decoration images 465 to the material IDs and decoration image data of the decoration images searched for and obtained from the media data storage unit 132. The communication unit 121 transmits the generated decoration image response message 461 to the terminal 102.

(Step S311)

In this step, the terminal 102 displays the decoration images obtained from the editing server 101, and the user selects a decoration to replace, from the displayed decoration images.

Having received the decoration image response message 461 via the communication unit 201, the template editing application displays the decoration images included in the received decoration image response message 461, in the material display area 433.

Figure 28:
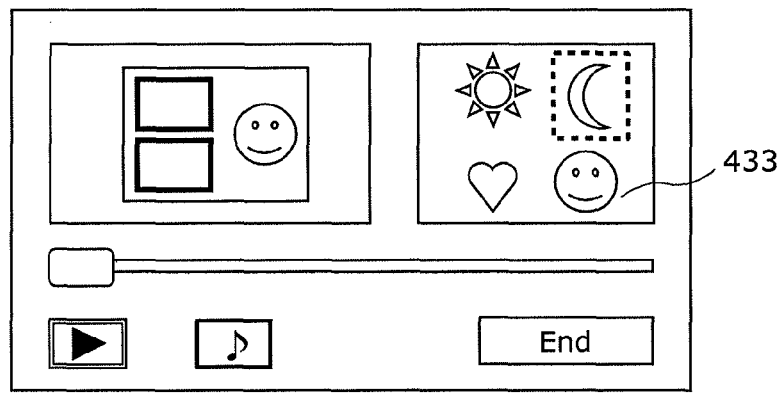
FIG. 28 is a diagram showing a template editing screen on which decoration images are displayed in a scene display area according to the embodiment.

FIG. 28 is a diagram showing an example of a template editing screen on which the decoration images are displayed in the material display area 433.

The user selects a decoration to replace, from the decoration images displayed in the material display area 433. The template editing application stores the material ID of the selected decoration image. This material ID is referred to as "replacing material ID".

(Step S312)

In this step, the terminal 102 makes a request to replace the decoration image in the template representative scene selected in Step S308 with the decoration image selected in Step S311, to the editing server 101.

Figure 29:
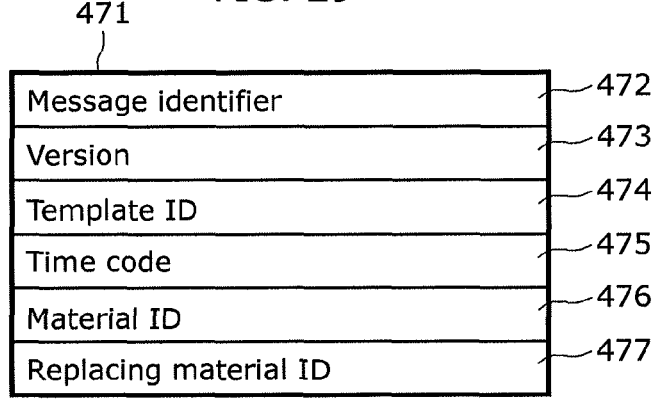
FIG. 29 is a diagram showing message data included in a decoration image replacement request message according to the embodiment.

The template editing application transmits a decoration image replacement request message to the editing server 101 via the communication unit 201. FIG. 29 is a diagram showing message data included in a decoration image replacement request message 471. The decoration image replacement request message 471 includes a message identifier 472, a version 473, a template ID 474, a time code 475, a material ID 476, and a replacing material ID 477 as message data.

The message identifier 472 is message data for identifying the message transmitted/received between the terminal 102 and the editing server 101. The version 473 is message data for identifying the version number of the message. The template ID 474 is the template ID corresponding to the template selected by the user in Step S305. The time code 475 is the time code corresponding to the template representative scene selected by the user as the editing object in Step S308. The material ID 476 is the material ID of the decoration image selected to be replaced by the user in Step S311. The replacing material ID 477 is the replacing material ID corresponding to the decoration image selected by the user in Step S311.

Upon generating the decoration image replacement request message 471, the template editing application sets the message identifier 472 to "0009" indicating the decoration image replacement request message, the version 473 to "0100" indicating the initial version, and the template ID 474 to the template ID of the template selected by the user. Suppose the template ID is "PM0001" in this example. The template editing application also sets the time code 475 to the time code corresponding to the template representative scene selected by the user as the editing object in Step S308. The template editing application sets the material ID 476 to the material ID of the decoration image selected to be replaced by the user in Step S311. The template editing application sets the replacing material ID 477 to the replacing material ID corresponding to the decoration image selected by the user in Step S311. The template editing application transmits the generated decoration image replacement request message 471 to the editing server 101 via the communication unit 201.

(Step S313)

In this step, the editing server 101 replaces the decoration image.

Having received the decoration image replacement request message 471, the communication unit 121 in the editing server 101 searches the media data stored in the media data storage unit 132 using the replacing material ID included in the received message, to obtain the URL which is the material ID of the decoration image to replace. For example, in the case where the replacing material ID is "PM2011", the communication unit 121 obtains the material data URL "file://decorations/star002.jpg". This material data URL is referred to as "replacing material data URL".

Next, the communication unit 121 searches the template table 331 and the material table 341 stored in the template information storage unit 130 using the template ID and the material ID included in the received message, to obtain the material data URL of the decoration image to be replaced. For example, in the case where the template ID is "PM0001" and the material ID is "PM2002", the communication unit 121 obtains the material data URL "file://decorations/cake002.jpg" of the decoration image. This material data URL is referred to as "replaced material data URL".

The communication unit 121 then writes the replacing material data URL over the replaced material data URL. The decoration data is replaced in this way.

Figure 30A:
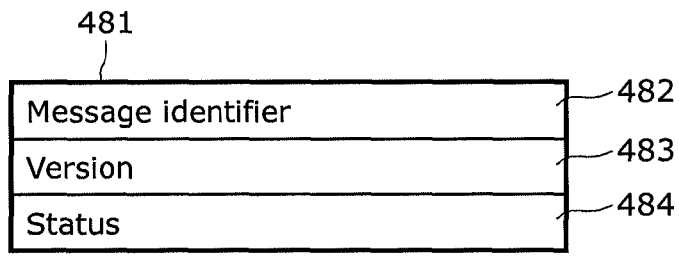
FIG. 30A is a diagram showing message data included in a decoration image replacement response message according to the embodiment.

Lastly, the communication unit 121 transmits a decoration image replacement response message to the terminal 102. FIG. 30A is a diagram showing message data included in a decoration image replacement response message 481. The decoration image replacement response message 481 includes a message identifier 482, a version 483, and a status 484 as message data.

The message identifier 482 is message data for identifying the message transmitted/received between the terminal 102 and the editing server 101. The version 483 is message data for identifying the version number of the message. The status 484 is message data for notifying the decoration image replacement result.

Upon generating the decoration image replacement response message 481, the communication unit 121 sets the message identifier 482 to "0010" indicating the decoration image replacement response message, the version 483 to "0100" indicating the initial version, and the status 484 to "0000" indicating success. The communication unit 121 transmits the generated decoration image replacement response message 481 to the terminal 102.

(Step S314)

In this step, the terminal 102 makes a request for template data to the editing server 101 in order to reproduce the edited template.

Figure 30B:
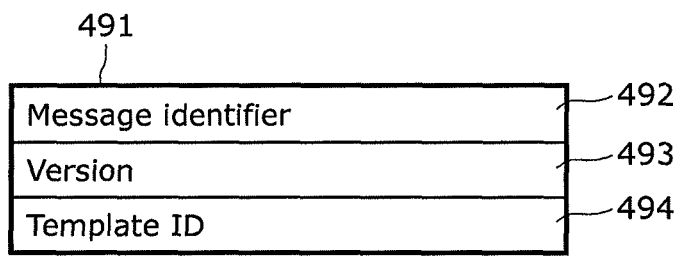
FIG. 30B is a diagram showing message data included in a template data request message according to the embodiment.

The user presses the play button 435 in the template editing screen 431. When the play button 435 is pressed, the template editing application transmits a template data request message to the editing server 101, to obtain the template data from the editing server 101. FIG. 30B is a diagram showing message data included in a template data request message 491. The template data request message 491 includes a message identifier 492, a version 493, and a template ID 494 as message data.

The message identifier 492 is message data for identifying the message transmitted/received between the terminal 102 and the editing server 101. The version 493 is message data for identifying the version number of the message. The template ID 494 is the template ID of the template to be reproduced.

Upon generating the template data request message 491, the template editing application sets the message identifier 492 to "000a" indicating the template data request message, the version 493 to "0100" indicating the initial version, and the template ID 494 to the template ID of the template to be reproduced. Suppose the template ID is "PM0001" in this example. The template editing application transmits the generated template data request message 491 to the editing server 101 via the communication unit 201.

(Step S315)

In this step, the editing server 101 identifies the template to be reproduced, which is requested by the terminal 102.

Having received the template data request message, the communication unit 121 in the editing server 101 extracts the value of the template ID 494 included in the template data request message 491.

(Step S316)

In this step, the editing server 101 determines the security level of the terminal requesting the template data.

The security level determination unit 124 in the editing server 101 determines the security level, from the value of the security level 377 included in the template editing request message 371 received in Step S302. In detail, in the case where the value of the security level is less than or equal to 5, the security level determination unit 124 determines that the security level of the terminal is low. In the case where the value of the security level is greater than or equal to 6, the security level determination unit 124 determines that the security level of the terminal is high.

(Step S317)

In this step, the editing server 101 determines the script processing capability of the terminal requesting the template data.

The processing capability determination unit 123 in the editing server 101 determines whether or not the value of the script processing capability information 376 included in the template editing request message 371 received in Step S302 is "0". In the case where the value is "0", the processing capability determination unit 123 determines that the terminal is a terminal having no script execution unit, i.e. a terminal having no media control script runtime environment (the terminal 103). In the case where the value is other than "0", the processing capability determination unit 123 determines that the terminal is a terminal having a script execution unit, i.e. a terminal having a media control script runtime environment, and that the capability level of the terminal is the value of the script processing capability information 376.

(Step S318)

In this step, the editing server 101 determines the content format of the template data to be generated, from the security level and script processing capability of the terminal requesting the template data.

Figure 31A:
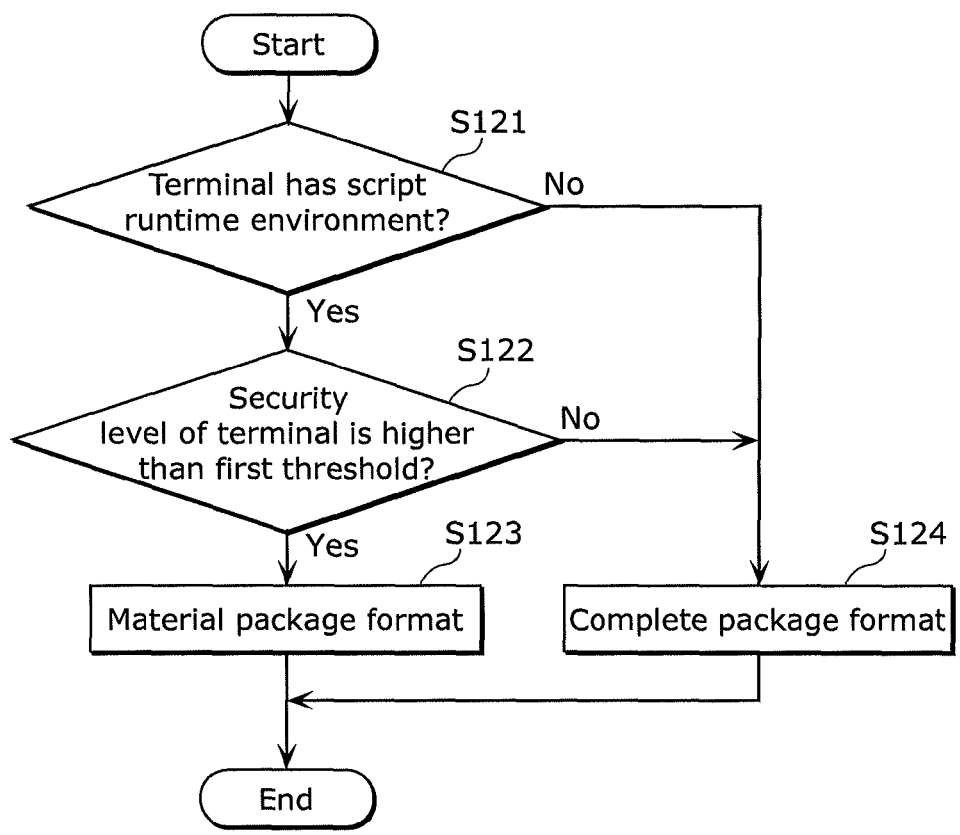
FIG. 31A is a flowchart of a package format determination process according to the embodiment.

FIG. 31A is a flowchart of the process of determining the content format.

As shown in FIG. 31A, the format determination unit 122 in the editing server 101 determines whether or not the terminal has the script runtime environment (Step S121). The format determination unit 122 also determines whether or not the security level of the terminal is higher than a first threshold (Step S122).

In the case where the security level of the terminal is low (Step S122: No) or in the case where the terminal does not have the script runtime environment (Step S121: No), the format determination unit 122 determines to generate complete package template data (i.e. template data in the complete package format) (Step S124). In the case where the terminal has the script execution function and the security level of the terminal is high (Step S121: Yes, and Step S122: Yes), the format determination unit 122 determines to generate material package template data (i.e. template data in the material package format) (Step S123).

Figure 31B:
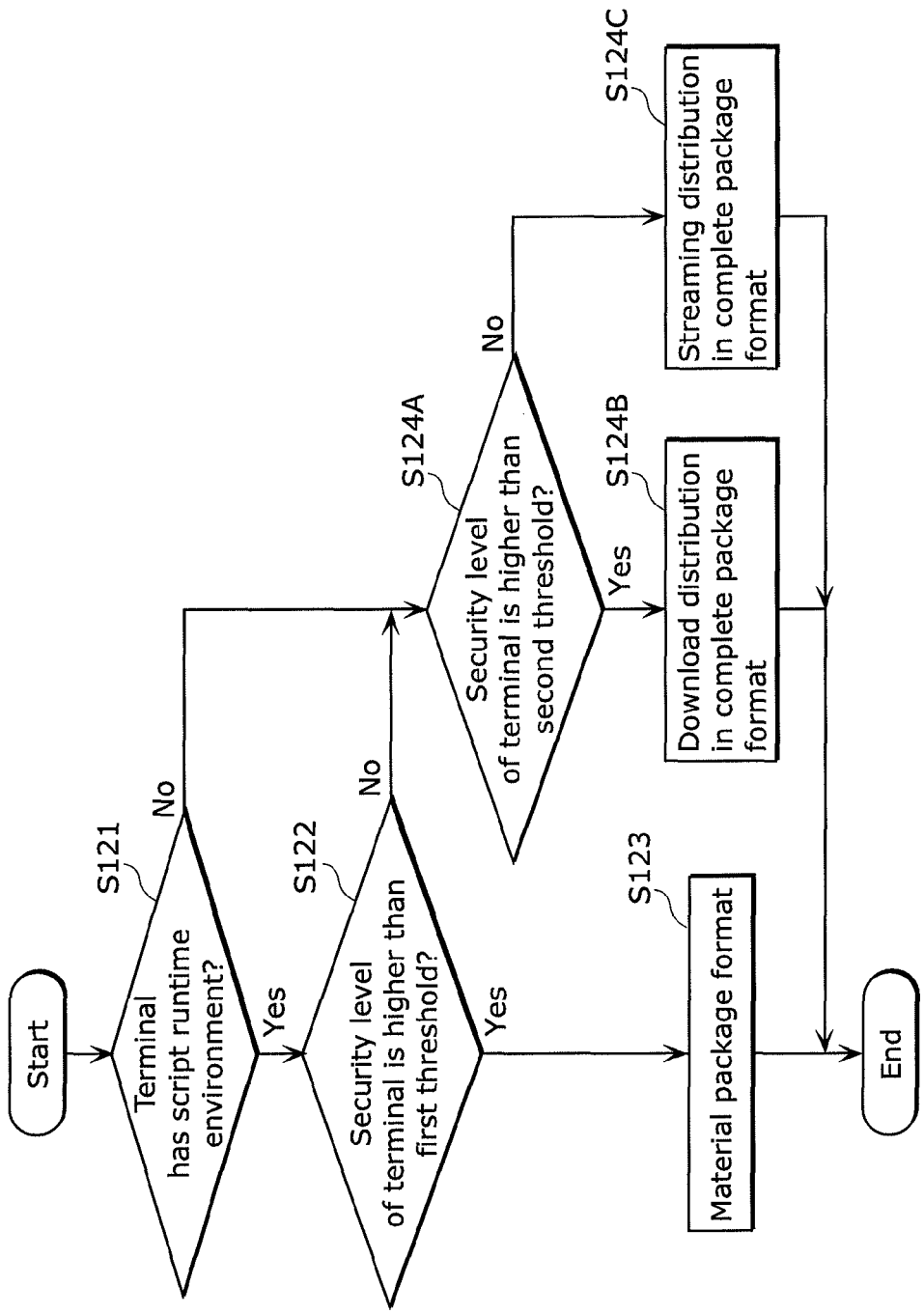
FIG. 31B is a flowchart of a variation of a package format determination process according to the embodiment.

The format determination unit 122 may further determine whether the complete package template is to be transmitted in a download distribution mode or a streaming distribution mode, according to the security level. For example, as shown in FIG. 31B, in the case where the security level of the terminal is lower than the first threshold (Step S122: No) or in the case where the terminal does not have the script runtime environment (Step S121: No), the format determination unit 122 determines whether or not the security level of the terminal is higher than a second threshold (Step S124A). The second threshold is lower than the first threshold.

In the case where the security level of the terminal is higher than the second threshold (Step S124A: Yes), the format determination unit 122 determines to transmit the complete package in the download distribution mode (Step S124B). In the case where the security level of the terminal is lower than the second threshold (Step S124A: No), the format determination unit 122 determines to transmit the complete package in the streaming distribution mode (Step S124C). This prevents unauthorized use of material data included in the template in a terminal of a low security level.

(Step S319)

In the case where the material package format is selected in Step S318 (Step S319: material package), the process proceeds to Step S320. In the case where the complete package format is selected in Step S318 (Step S319: complete package), the process proceeds to Step S321.

(Step S320)

In this step, the editing server 101 generates the material package template data. Here, the editing server 101 changes the generated template data according to the processing capability of the terminal, as described with reference to FIG. 2B. A specific example is given below.

The material package generation unit 125 in the editing server 101 searches the template table 331 stored in the template information storage unit 130 using the template ID identified in Step S315, to obtain the material table ID corresponding to the template ID. The material package generation unit 125 then searches the material table 341 stored in the template information storage unit 130 using the material table ID obtained as a result of the search, to obtain all material data and material IDs included in the template. The material package generation unit 125 reconfigures the media control script included in the material data, according to the script processing capability of the terminal determined in Step S317. Lastly, the material package generation unit 125 archives the obtained material data, thereby generating the template data.

The process in the case where the template ID is "PM0001" is described as a specific example below.

The material package generation unit 125 in the editing server 101 first searches the template table 331 using the template ID "PM0001", to obtain the material table ID "3628".

The material package generation unit 125 then searches the material table 341 using the material table ID "3628" obtained as a result of the search, to obtain the image data "cake001.jpg" and its material ID "PM2001", the image data "star002.jpg" and its material ID "PM2003", the BGM data "birthday.mp3" and its material ID "PM4001", and the media control script "happy.js" and its material ID "S0001" that are included in the template.

Further, the script generation unit 112 in the editing server 101 reconfigures the media control script "happy.js" included in the material data, according to the script processing capability of the terminal determined in Step S317.

Figures 32, 33, 34:
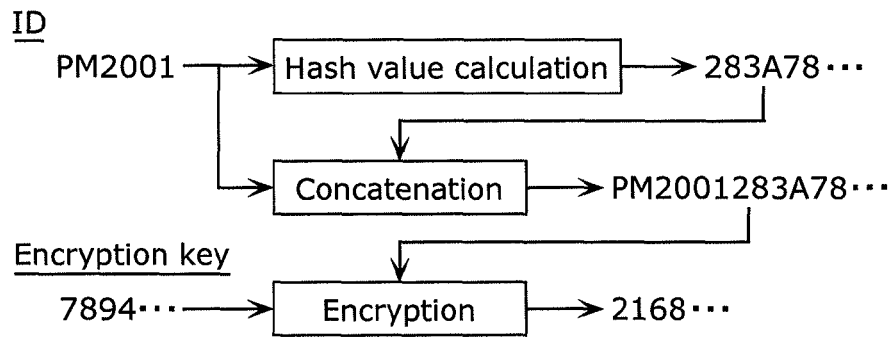
FIG. 32 is a diagram schematically showing a media control script according to the embodiment.
FIG. 33 is a diagram showing data included in a material data archive generated according to a material data archive format according to the embodiment.
FIG. 34 is a diagram showing an example of a material information protection process according to the embodiment.

An example of reconfiguration is given below. FIG. 32 is a diagram schematically showing a media control script. The media control script includes an initial value setting part 501, a drawing processing part 502, and a BGM reproduction processing part 503. The initial value setting part 501 sets the interval at which the drawing processing part 502 is executed. The drawing processing part 502 moves and displays image data. The BGM reproduction processing part 503 reproduces BGM.

In the case where the script processing capability is high, the script generation unit 112 reconfigures the initial value setting part 501 to shorten the execution interval so that a smooth operation effect is attained. In the case where the script processing capability is low, on the other hand, the script generation unit 112 reconfigures the initial value setting part 501 to lengthen the execution interval so that the operation effect is reduced. Though the script generation unit 112 reconfigures the media control script by changing the setting of the initial value setting part 501 in this example, any process may be performed so long as the same advantageous effects are achieved. For example, the script generation unit 112 may replace a part or whole of the drawing processing part 502 according to the script processing capability. Alternatively, the script generation unit 112 may delete a part or whole of the drawing processing part 502 according to the script processing capability.

Lastly, the material package generation unit 125 in the editing server 101 generates an archive ID unique to the archive. The material package generation unit 125 archives the obtained image data and BGM data and the reconfigured media control script, in a format shown in FIG. 33.

FIG. 33 is a diagram showing data included in a material data archive 511 generated according to the material data archive format. The material data archive 511 includes an archive type 512, an archive ID 513, an archive file name 514, an archive size 515, a material count 516, a material type 517, a material ID 518, a material file name 519, a material size 520, and material data 521.

The archive type 512 is data for identifying the type of the archive, and indicates the archive format. Though the MIME format is used for the archive type 512 here, other formats may be used. The archive ID 513 is an identifier for identifying the archive. Here, the archive ID 513 designates the generated archive ID. The archive file name 514 is the file name of the material data archive.

The archive size 515 is the number of bytes of the material data archive. The material count 516 is the number of materials included in the material data archive. The material type 517 is data for identifying the type of the material. Though the MIME format is used for the material type 517 here, other formats may be used.

The material ID 518 is an identifier for identifying the material. Here, the material ID 518 designates the material ID. The material file name 519 is the file name of the material data. The material size 520 is the number of bytes of the material data archive. The material data 521 is the material data.

The archive ID 513 and the material ID 518 undergo the following protection process by the material information protection unit 129. For each ID, the material information protection unit 129 calculates a hash value, concatenates the calculated hash value to the material ID, and encrypts the concatenated data using an encryption key held in the material information protection unit 129. FIG. 34 shows an example of the material information protection process.

(Step S321)

In this step, the editing server 101 generates the complete package template data.

The complete package generation unit 126 in the editing server 101 searches the template table 331 stored in the template information storage unit 130 using the template ID identified in Step S315, to obtain the material table ID corresponding to the template ID.

The complete package generation unit 126 then searches the material table 341 stored in the template information storage unit 130 using the material table ID obtained as a result of the search, to obtain all material data and material IDs included in the template.

Further, the script execution unit 128 in the editing server 101 executes the media control script in the material data included in the template. The media control script executed by the script execution unit 128 reproduces the template content, using the image data and the BGM data in the material data. The complete package generation unit 126 captures the reproduced template content, thereby generating the complete package template data.

Lastly, the material information embedment unit 127 in the editing server 101 generates the archive ID. The material ID of the material data included in the template and the archive ID undergo the protection process, and the protected IDs are embedded in the complete package template data. The protection of the material ID and the archive ID is performed by the material information protection unit 129 in the editing server 101.

The process in the case where the template ID is "PM0001" is described as a specific example below.

The complete package generation unit 126 in the editing server 101 first searches the template table 331 using the template ID "PM0001", to obtain the material table ID "3628".

The complete package generation unit 126 then searches the material table 341 using the material table ID "3628" obtained as a result of the search, to obtain the image data "cake001.jpg" and its material ID "PM2001", the image data "star002.jpg" and its material ID "PM2003", the BGM data "birthday.mp3" and its material ID "PM4001", and the media control script "happy.js" and its material ID "S0001" that are included in the template.

Further, the script execution unit 128 in the editing server 101 executes the media control script "happy.js". The complete package generation unit 126 captures the reproduced template content, to generate the complete package template data. Here, the complete package generation unit 126 captures the content by reading data written to a reproduction frame buffer in the editing server 101.

Figure 35:
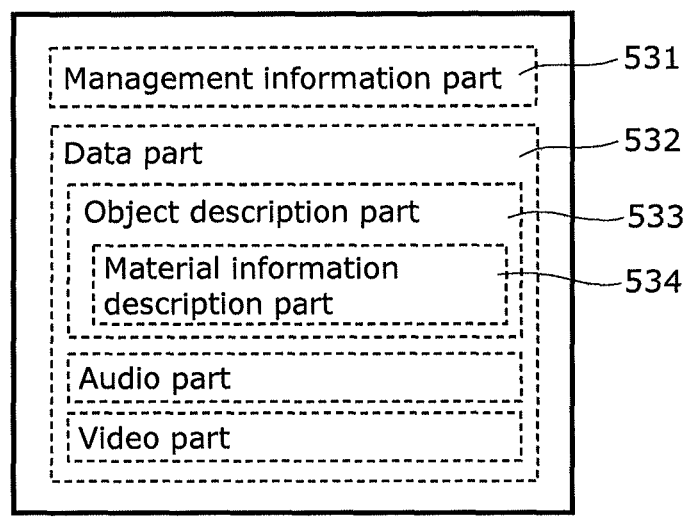
FIG. 35 is a diagram showing template data in a complete package format according to the embodiment.

Lastly, for each of the archive ID and the material IDs of the material data included in the template, the material information protection unit 129 in the editing server 101 calculates the hash value, concatenates the calculated hash value to the material ID, and encrypts the concatenated data using the encryption key held in the material information protection unit 129. FIG. 34 shows an example of the material information protection process. The material information embedment unit 127 in the editing server 101 embeds the encrypted ID data obtained as a result of the protection process, in the complete package template data. FIG. 35 is a diagram showing the generated complete package template data. The template data is divided into a management information part 531 and a data part 532, and various data are held in the data part 532. The encrypted ID data is included in a material information description part 534 in an object description part 533 in the data part 532.

(Step S322)

In this step, the editing server 101 transmits the template data to the terminal 102. The format of the template data transmitted to the terminal 102 is the format determined in Step S319.

Figure 36:
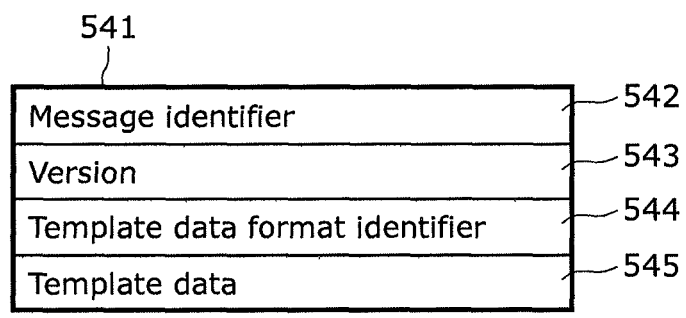
FIG. 36 is a diagram showing message data included in a template data response message according to the embodiment.

The communication unit 121 in the editing server 101 transmits a template data response message including the template data generated in Step S320 or S321, to the terminal 102. FIG. 36 is a diagram showing message data included in a template data response message 541. The template data response message 541 includes a message identifier 542, a version 543, a template data format identifier 544, and template data 545 as message data.

The message identifier 542 is message data for identifying the message transmitted/received between the terminal 102 and the editing server 101. The version 543 is message data for identifying the version number of the message. The template data format identifier 544 is an identifier for identifying whether the template data included in the message is in the material package format or the complete package format. The template data 545 is the template data.

Upon generating the template data response message 541, the communication unit 121 performs the following process.

The communication unit 121 sets the message identifier 542 to "000B" indicating the template data response message, and the version 543 to "0100" indicating the initial version.

In the case of determining to generate the material package template data in Step S319, the communication unit 121 sets the template data format identifier 544 to "0001" indicating the material package format. In the case of determining to generate the complete package template data in Step S319, the communication unit 121 sets the template data format identifier 544 to "0002" indicating the complete package format.

The communication unit 121 also sets the template data 545 to the template data generated in Step S320 or S321.

The communication unit 121 transmits the generated template data response message 541 to the terminal 102.

In the case of determining to transmit the complete package in the download mode or the streaming mode as shown in FIG. 31B, the communication unit 121 transmits the complete package in the download mode or the streaming mode according to the determination result.

(Step S323)

In this step, the terminal 102 reproduces the template data obtained from the editing server 101.

Since the process in this step is different depending on the reproduction terminal, the process by the terminal 102 and the process by the terminal 103 are described in this order below.

Having received the template data response message 541 via the communication unit 201, the template editing application in the terminal 102 extracts the template data from the received template data response message 541. The extracted template data is the material data archive in the material package format. The template editing application expands the extracted material data archive in the content format analysis unit 206. The template editing application then executes the media control script in the expanded material data, in the script execution unit 207. The executed script is reproduced together with the other material data in the media reproduction unit 208. Lastly, the template editing application displays the reproduced template data in the scene display area 432 in the template editing screen 431, via the output unit 209.

Having received the template data response message 541 via the communication unit 201, the template editing application in the terminal 103 extracts the template data from the received template data response message 541. The extracted template data is the template data in the complete package format. The template editing application expands the extracted complete package template data in the content format analysis unit 206. The template editing application then decodes the video stream and the audio stream in the media reproduction unit 208. Lastly, the template editing application displays the reproduced stream in the scene display area 432 in the template editing screen 431, via the output unit 209.

The user checks the reproduced template data. In the case of further re-editing the template, the process from Step S311 is performed again. In the case of ending the template editing, the user presses the end button 437, as a result of which the display screen returns to the multimedia content editing process selection screen.

This completes the description of the template editing process.

Though the editing process by decoration image replacement is described as the template editing process, BGM and reproduction effects can be edited through the same process.

Moreover, in the template editing process, the editing server 101 may perform message communication after authenticating the terminal 102 or 103. This prevents the template data from being transmitted to an unintended terminal. Furthermore, the communication path between the editing server 101 and each of the terminals 102 and 103 may be encrypted. This prevents the template data from being stolen by eavesdropping on the communication path.

Though the editing server 101 generates the template representative scenes and transmits the generated template representative scenes to the terminal 102 in Step S307, the terminal 102 may generate the template representative scenes.

In this case, the editing server 101 determines the security level and script processing capability of the terminal, by performing the same process as Steps S316 to S317. In the case where the security level of the terminal is high and the terminal has the script execution unit, the editing server 101 obtains the material data of the template corresponding to the template ID. The editing server 101 generates the material package template by performing the same process as Step S320, and transmits the generated template to the terminal 102.

The terminal 102 reproduces the material package template to generate the template representative scenes, by performing the same process as Step S323. Alternatively, the editing server 101 generates the complete package template by performing the same process as Step S321, and transmits the generated template to the terminal 102 or 103. The terminal 102 or 103 reproduces the complete package template to generate the template representative scenes, by performing the same process as Step S323. The processing load on the editing server 101 can be reduced in this way.

Though the editing server 101 transmits the decoration images usable for replacement in the template representative scene to the template editing application in Steps S309 to S310, the editing server 101 may transmit the decoration images together with the representative scenes. This reduces the number of communication operations. Besides, the editing server 101 may not transmit the decoration images in the case where the security level of the terminal 102 is low. The leakage of the decoration images can be prevented in this way.

Though the decoration image replacement process is performed in Step S313, a decoration image may be added or deleted through the same process.

Though the editing server 101 determines the security level of the terminal from the security level value in Step S316, the editing server 101 may determine the security level of the terminal from the terminal type.

Though the editing server 101 determines the script processing capability of the terminal from the value of the script processing capability information in Step S317, the editing server 101 may determine the script processing capability of the terminal from the terminal type.

In Step S319, the editing server 101 may determine the content format of the generated template data as the complete package format, in the case where the script processing capability of the terminal 102 is low. This enhances the display effect, though the freedom of re-editing is reduced.

Though the editing server 101 generates the material package template data in Step S320 and the complete package template data in Step S321, the template data of all patterns may be generated beforehand. The processing load on the editing server 101 during the execution can be reduced in this way.

(Content Editing Process)

The content editing process is described next.

Figure 37A:
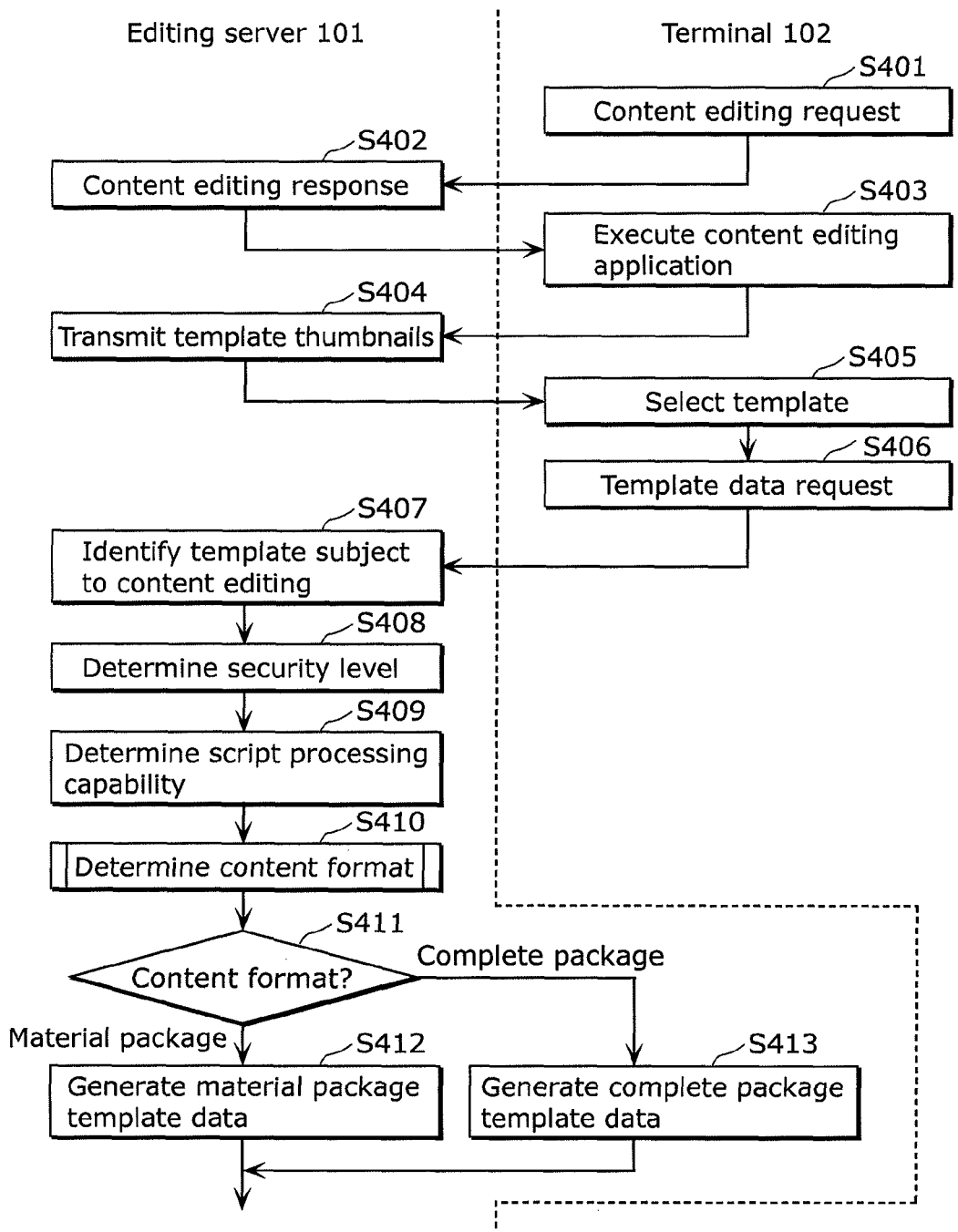
FIG. 37A is a flowchart showing flow of a template editing process according to the embodiment.

FIGS. 37A and 37B are flowcharts showing flow of the content editing process. The content editing process is described below, with reference to FIGS. 37A and 37B. It is assumed here that user authentication using the user ID and the password has been completed before the content editing process starts.

(Step S401)

In this step, the terminal 102 makes a content editing request to the editing server 101.

The control unit 210 in the terminal 102 transmits a content editing request message to the editing server 101 via the communication unit 201. FIG. 38 is a diagram showing message data included in a content editing request message 551. The content editing request message 551 includes a message identifier 552, a version 553, a user ID 554, a script execution unit version 555, script processing capability information 556, and a security level 557 as message data. These message data are the same as those in the template editing request message shown in FIG. 17, and so their description is omitted.

Upon generating the content editing request message 551, the control unit 210 sets the message identifier 552 to "0101" indicating the content editing request message, the version 553 to "0100" indicating the initial version, and the user ID 554 to the user ID "KM".

The control unit 210 also sets the script execution unit version 555 to the value of the version information 302 stored in the processing capability storage unit 202, and the script processing capability information 556 to the value of the script processing capability information 303 stored in the processing capability storage unit 202. In the case where the terminal has no script execution unit (the terminal 103), the control unit 210 sets the script execution unit version 555 and the script processing capability information 556 to a null value "0".

The control unit 210 further sets the security level 557 to the value stored in the security information storage unit 204.

The control unit 210 transmits the generated content editing request message 551 to the editing server 101 via the communication unit 201.
(Step S402)

In this step, the editing server 101 makes a content editing response.

Figure 39:
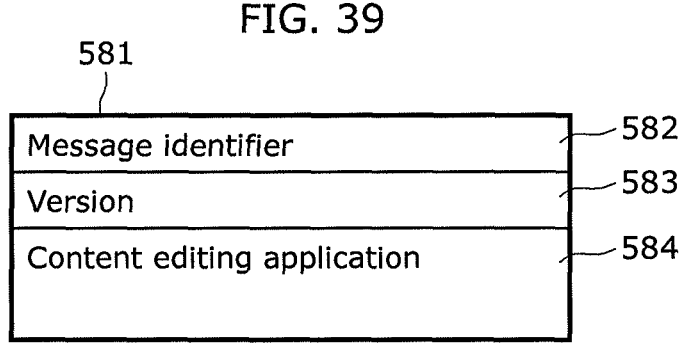
FIG. 39 is a diagram showing message data included in a content editing response message according to the embodiment.

Having received the content editing request message 551, the communication unit 121 in the editing server 101 transmits a content editing response message to the terminal 102. FIG. 39 is a diagram showing message data included in a content editing response message 581. The content editing response message 581 includes a message identifier 582, a version 583, and a content editing application 584 as message data.

The message identifier 582 is message data for identifying the message transmitted/received between the terminal 102 and the editing server 101. The version 583 is message data for identifying the version number of the message. The content editing application 584 is a content editing application program executed in the terminal 102. The content editing application 584 may directly run in the terminal 102, or run in a browser in the terminal 102.

Upon generating the content editing response message 581, the communication unit 121 sets the message identifier 582 to "0102" indicating the content editing response message, the version 583 to "0100" indicating the initial version, and the content editing application 584 to the content editing application stored in an application storage unit (not shown) in the editing server 101. The communication unit 121 transmits the generated content editing response message to the terminal 102.
(Step S403)

In this step, the terminal 102 executes the content editing application.

The content editing application directly runs in the terminal 102 or runs in the browser in the terminal 102, and outputs a content editing screen via the output unit 209. Content editing is a function of generating multimedia content by embedding content such as photographs and video of the user based on a template prepared beforehand or a template previously generated by the user.

When executed by the terminal 102, the content editing application transmits a template thumbnail request message to the editing server 101 via the communication unit 201. The template thumbnail request message is the same as that in Step S303, and so its description is omitted.
(Step S404)

In this step, the editing server 101 transmits requested template thumbnails to the terminal 102. The same process as Step S304 is performed in this step.
(Step S405)

In this step, the user selects a template used for content editing.

Figure 40:
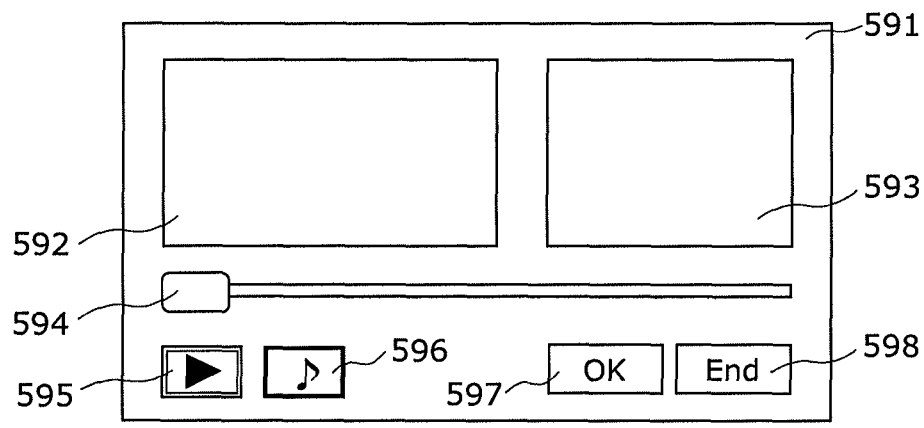
FIG. 40 is a diagram showing an example of a content editing screen according to the embodiment.

Having received the template thumbnail response message, the terminal 102 displays a content editing screen 591 shown in FIG. 40. Here, the terminal 102 outputs the screen via the output unit 209. The terminal 102 displays the template thumbnail data included in the received template thumbnail response message, on the content editing screen 591 as the template thumbnails.

The content editing screen 591 includes a scene display area 592, a material display area 593, a slide bar 594, a play button 595, a BGM change button 596, an OK button 597, and an end button 598.

The user selects a template as a basis for generation, from the content editing screen 591 shown in FIG. 40. The template is selected via the input unit 205. Having selected the template, the user presses the OK button 597.
(Step S406)

In this step, the terminal 102 makes a request for template data for the template selected in Step S405, to the editing server 101.

The user presses the play button 595 in the content editing screen 591. When the play button 595 is pressed, the content editing application transmits a template data request message, to obtain the template data from the editing server 101. The template data request message is the same as that in Step S314, and so its description is omitted.
(Step S407)

In this step, the editing server 101 identifies the template to be reproduced, which is requested by the terminal 102. The same process as Step S315 is performed in this step.
(Step S408)

The security level determination unit 124 in the editing server 101 determines the security level, from the value of the security level 557 included in the content editing request message 551 received in Step S402. In detail, in the case where the value of the security level is less than or equal to 5, the security level determination unit 124 determines that the security level of the terminal is low.

In the case where the value of the security level is greater than or equal to 6, the security level determination unit 124 determines that the security level of the terminal is high.
(Step S409)

In this step, the editing server 101 determines the script processing capability of the terminal requesting the template data.

The processing capability determination unit 123 in the editing server 101 determines whether or not the value of the script processing capability information 556 included in the template editing request message 551 received in Step S402 is "0". In the case where the value is "0", the processing capability determination unit 123 determines that the terminal is a terminal having no script execution unit, i.e. a terminal having no media control script runtime environment (the terminal 103). In the case where the value is other than "0", the processing capability determination unit 123 determines that the terminal is a terminal having a script execution unit, i.e. a terminal having a media control script runtime environment, and that the capability level of the terminal is the value of the script processing capability information 556.
(Step S410)

In this step, the editing server 101 determines the content format of the template to be generated, from the security level and script processing capability of the terminal requesting the template data. The same process as Step S318 is performed in this step.
(Step S411)

In the case where the material package format is selected in Step S410 (Step S411: material package), the process proceeds to Step S412. In the case where the complete package format is selected in Step S410 (Step S411: complete package), the process proceeds to Step S413.

(Step S412)

In this step, the editing server 101 generates the material package template data. The same process as Step S320 is performed in this step.

(Step S413)

In this step, the editing server 101 generates the complete package template data. The same process as Step S321 is performed in this step.

(Step S414)

In this step, the editing server 101 transmits the template data to the terminal 102. The format of the template data transmitted to the terminal 102 is the format determined in Step. S411.

The communication unit 121 in the editing server 101 transmits a template data response message including the template data generated in Step S412 or S413. The template data response message is the same as that in Step S322, and so its description is omitted.

(Step S415)

In this step, the terminal 102 reproduces the template data obtained from the editing server 101. The same process as Step S323 is performed in this step, except that the reproduced template data is displayed in the content reproduction area 592 in the content editing screen 591.

The user checks the reproduced template data, and presses the OK button 597. In the case of using another template, the process from Step S403 is performed again. In the case of stopping the content editing, the user presses the end button 598, as a result of which the display screen returns to the multimedia content editing process selection screen.

(Step S416)

In this step, the terminal 102 displays thumbnail images of photographs held by the user. The user selects each photograph which he or she wants to embed in the template, from the displayed thumbnail images of the photographs.

The content editing application displays the thumbnail images of the photographs held in the terminal 102, in the material display area 593.

Figure 41:
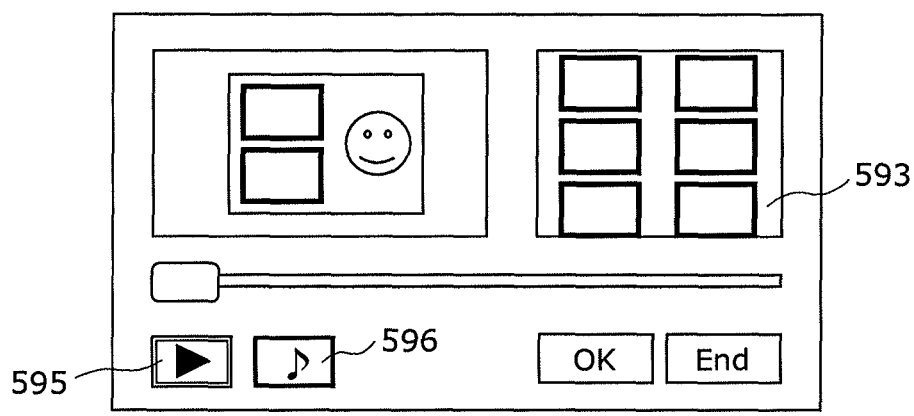
FIG. 41 is a diagram showing a content editing screen on which thumbnail images of photographs are displayed in a material display area according to the embodiment.

FIG. 41 is a diagram showing an example of the content editing screen 591 on which the thumbnail images of the photographs are displayed in the material display area 593.

The user selects each photograph which he or she wants to embed in the template, from the thumbnail images of the photographs displayed in the material display area 593. At most a predetermined number of photographs can be selected.

(Step S417)

In this step, the terminal 102 makes a request for multimedia content in which the photographs selected in Step S416 are embedded in the template determined in Step S415, to the editing server 101.

Figure 42:
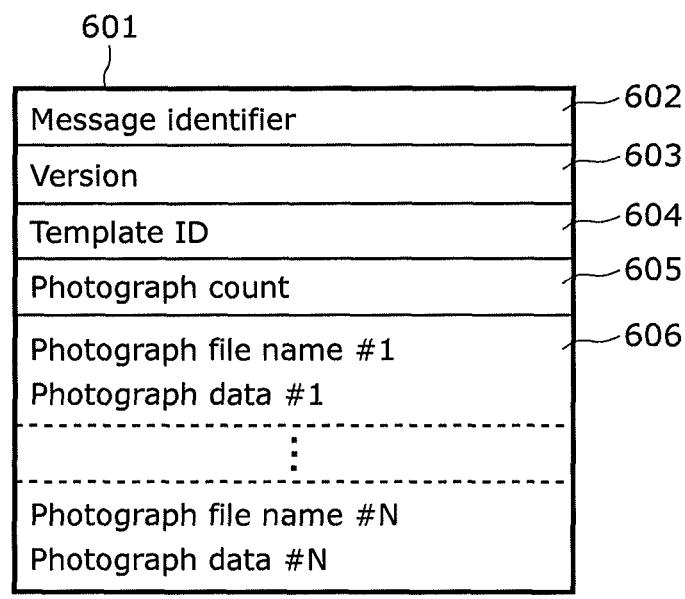
FIG. 42 is a diagram showing message data included in a multimedia content request message according to the embodiment.

The content editing application transmits a multimedia content request message to the editing server 101 via the communication unit 201. FIG. 42 is a diagram showing message data included in a multimedia content request message 601. The multimedia content request message 601 includes a message identifier 602, a version 603, a template ID 604, a photograph count 605, and photographs 606 as message data.

The message identifier 602 is message data for identifying the message transmitted/received between the terminal 102 and the editing server 101. The version 603 is message data for identifying the version number of the message. The template ID 604 is the template ID corresponding to the template determined by the user in Step S415. The photograph count 605 is the number of photographs embedded. The photographs 606 each include a photograph file name which is a file name of photograph data, and photograph data which is the photograph data embedded. The photographs 606 are successively stored for the number of photographs indicated by the photograph count 605.

Upon generating the multimedia content request message 601, the content editing application sets the message identifier 602 to "0103" indicating the multimedia content request message, the version 603 to "0100" indicating the initial version, and the template ID 604 to the template ID of the template determined by the user. Suppose the template ID is "PM0001" in this example. The photograph count 605 is the number of photographs embedded. Suppose the number of photographs is "20" in this example. The photographs 606 include 20 pieces of photograph data selected by the user in Step S416. The content editing application transmits the multimedia content request message 601 to the editing server 101 via the communication unit 201.

(Step S418)

In this step, the editing server 101 identifies the template subject to the content editing requested by the terminal 102.

Having received the multimedia content request message 601, the communication unit 121 in the editing server 101 extracts the value of the template ID 604 included in the multimedia content request message 601.

(Step S419)

In this step, the editing server 101 determines the content format of the multimedia content to be generated, from the security level and script processing capability of the terminal requesting the multimedia content.

In the case where the security level of the terminal determined in Step S408 is low or in the case where the terminal is determined as not having the script execution unit in Step S409, the format determination unit 122 in the editing server 101 determines to generate complete package multimedia content data. Otherwise, the format determination unit 122 determines to generate material package multimedia content data.

In the case where the material package format is selected (Step S419: material package), the process proceeds to Step S420. In the case where the complete package format is selected (Step S419: complete package), the process proceeds to Step S421.

(Step S420)

In this step, the editing server 101 generates the material package multimedia content data.

The material package generation unit 125 first obtains all material data and material IDs included in the template corresponding to the template ID identified in Step S418. The material package generation unit 125 then reconfigures the media control script included in the material data, according to the script processing capability of the terminal determined in Step S409. The obtainment of the material data and the reconfiguration of the media control script are performed by the method in Step S320. The embedment of the photograph data received in Step S418 is performed by embedding the photograph file names received in Step S418 as the photograph file names referred to by the media control script.

Lastly, the material package generation unit 125 archives the obtained image data and BGM data, the reconfigured media control script, and the photograph data included in the multimedia content request message 601, in the format shown in FIG. 33.

(Step S421)

In this step, the editing server 101 generates the complete package multimedia content data.

First, the complete package generation unit 126 obtains all material data and material IDs included in the template corresponding to the template ID identified in Step S418.

Next, the script execution unit 128 in the editing server 101 executes the media control script in the material data included in the template. The media control script executed by the script execution unit 128 reproduces the multimedia content, using the image data and BGM data in the material data and the photograph data included in the multimedia content request message 601. The complete package generation unit 126 captures the reproduced multimedia content, thereby generating the complete package multimedia content data.

Lastly, the material information embedment unit 127 in the editing server 101 generates the archive ID. The archive ID and the material ID of the material data included in the template undergo the protection process, and the protected IDs are embedded in the complete package multimedia content data. The protection of the archive ID and the material ID is performed by the material information protection unit 129 in the editing server 101.

(Step S422)

In this step, the editing server 101 transmits the multimedia content data to the terminal 102. The format of the multimedia content data transmitted to the terminal 102 is the format determined in Step S411.

Figure 43:
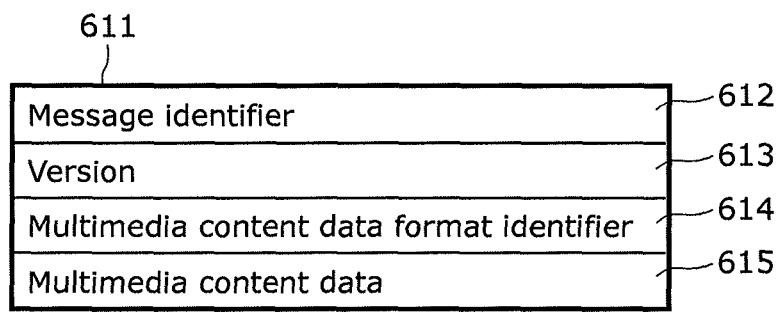
FIG. 43 is a diagram showing message data included in a multimedia content response message according to the embodiment.

The communication unit 121 in the editing server 101 transmits a multimedia content response message including the multimedia content data generated in Step S420 or S421, to the terminal 102. FIG. 43 is a diagram showing message data included in a multimedia content response message 611. The multimedia content response message 611 includes a message identifier 612, a version 613, a multimedia content data format identifier 614, and multimedia content data 615 as message data.

The message identifier 612 is message data for identifying the message transmitted/received between the terminal 102 and the editing server 101. The version 613 is message data for identifying the version number of the message. The multimedia content data format identifier 614 is an identifier for identifying whether the multimedia content data included in the message is in the material package format or the complete package format. The multimedia content data 615 is the multimedia content data.

Upon generating the multimedia content response message 611, the communication unit 121 performs the following process.

The communication unit 121 sets the message identifier 612 to "0104" indicating the multimedia content response message, and the version 613 to "0100" indicating the initial version.

In the case of determining to generate the material package multimedia content data in Step S411, the communication unit 121 sets the multimedia content data format identifier 614 to "0001" indicating the material package format. In the case of determining to generate the complete package multimedia content data in Step S411, the communication unit 121 sets the multimedia content data format identifier 614 to "0002" indicating the complete package format.

The communication unit 121 also sets the multimedia content data 615 to the multimedia content data generated in Step S420 or S421.

The communication unit 121 transmits the generated multimedia content response message 611 to the terminal 102.

(Step S423)

In this step, the terminal 102 reproduces the multimedia content data obtained from the editing server 101.

The reproduction of the multimedia content data is the same process as Step S323, except that the reproduced multimedia content data is displayed in the content reproduction area 592 in the content editing screen 591.

The user checks the reproduced multimedia content data. In the case of further re-editing the content, the process from Step S405 is performed again. In the case of ending the content editing, the user presses the end button 598, as a result of which the display screen returns to the multimedia content editing process selection screen.

This completes the description of the content editing process.

Though the editing process using photograph images is described as the content editing process, video can be edited through the same process.

Moreover, in the content editing process, the editing server 101 may perform message communication after authenticating the terminal 102 or 103. This prevents the multimedia content data from being transmitted to an unintended terminal. Furthermore, the communication path between the editing server 101 and each of the terminals 102 and 103 may be encrypted. This prevents the multimedia content data from being stolen by eavesdropping on the communication path.

Though the editing server 101 determines the security level of the terminal from the security level value in Step S408, the editing server 101 may determine the security level of the terminal from the terminal type.

Though the editing server 101 determines the script processing capability of the terminal from the value of the script processing capability information in Step S409, the editing server 101 may determine the script processing capability of the terminal from the terminal type.

In Steps S411 and S419, the format determination unit 122 may determine the content format of the generated template data as the complete package format, in the case where the script processing capability of the terminal 102 is low. This enhances the display effect, though the freedom of re-editing is reduced.

Though the terminal 102 transmits the photographs held in the terminal 102 to the editing server 101 in Step S417, the terminal 102 may transmit photographs held in the user's apparatus such as a digital still camera, a digital video camera, or a mobile phone connected to the terminal 102, to the editing server 101. The terminal 102 may also transmit photographs held in a network service used by the user, to the editing server 101.

Though the terminal 102 transmits the photographs to be embedded in the template to the editing server 101 in Step S417, the terminal 102 may transmit only the photograph file names without transmitting the photograph data in the case where the security level of the terminal 102 is high. This reduces the communication time, and also avoids the transmission of the photographs including the user's personal information to the editing server 101. In such a case, the photograph data held in the terminal 102 is used to reproduce the multimedia content data.

The process described above is also applicable in the case where the user who edits the multimedia content (editing user) and the user who reproduces the multimedia content (destination user) are different. In this case, the terminal 102 may transmit the script processing capability of the terminal of the destination user to the editing server 101, in Step S417. This enables the editing server 101 to generate the multimedia content according to the script processing capability of the terminal of the destination user. The editing server 101 may generate the multimedia content for the destination user and transmit the generated multimedia content to the destination user in this way. As an alternative, the process from Step S417 may be executed by the terminal of the destination user to generate the multimedia content for the destination user. In this case, the multimedia content according to the script processing capability and security level of the terminal of the destination user can be generated in Step S417.

In Steps S414 and S422, the editing server 101 may transmit the template in the download distribution mode in the case where the security level of the terminal is high, and transmit the template and the multimedia content in the streaming distribution mode in the case where the security level of the terminal is low. Unauthorized use of the material data included in the template or the multimedia content in a terminal of a low security level can thus be prevented.

Note that the user can change only a decoration image in multimedia content without changing any photograph used in the content, by executing the template editing process and the content editing process in sequence. In detail, first the template editing process is performed to change the decoration image in the template used in the original multimedia content, and then the content editing process is performed to embed, in the edited template, the photographs used in the original multimedia content. Thus, various processes are possible by combined use of the template editing process and the content editing process.

Though this embodiment describes an example of generating multimedia content by designating one template, a plurality of templates may be designated. In such a case, the designated templates are combined in the designation order.

Figure 44:
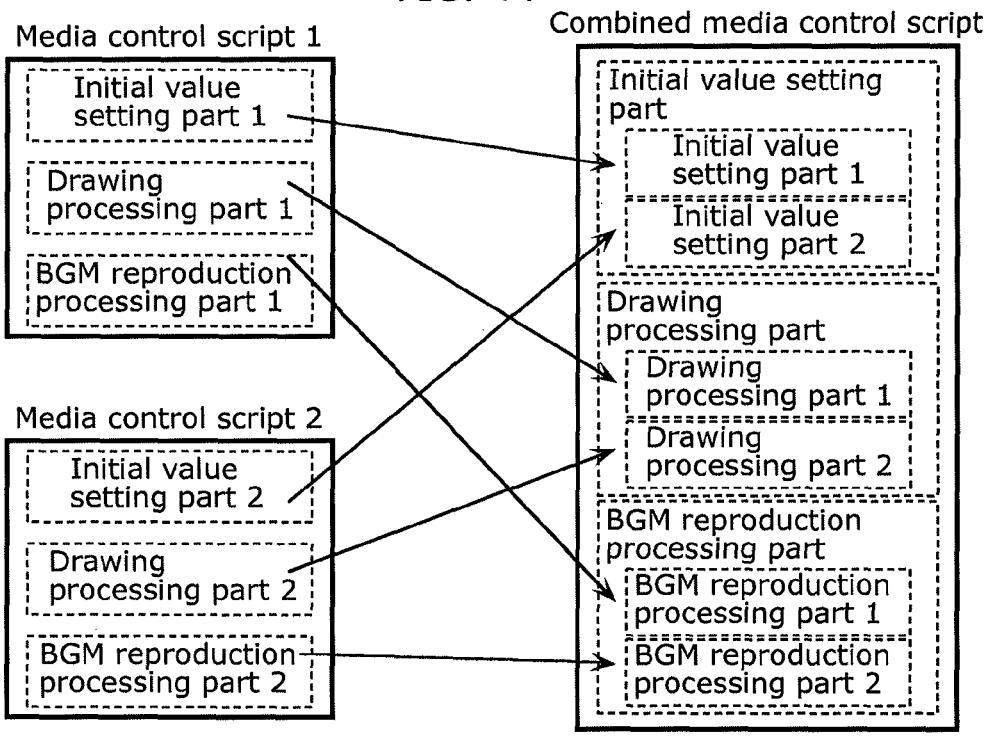
FIG. 44 is a diagram showing a process of combining two media control scripts according to the embodiment.

The case of combining two templates is described as an example below. The editing server 101 combines the templates, by combining the media control scripts included in the templates. FIG. 44 is a diagram showing the process of combining two media control scripts. As shown in FIG. 44, the editing server 101 combines the initial value setting parts, the drawing processing parts, and the BGM reproduction processing parts, each in the designation order. As a result of this process, the scenarios represented by the two media control scripts can be reproduced in sequence. The editing server 101 generates the multimedia content in Step S420 or S421 through the use of such a combined template.

Though this embodiment describes the case where the editing server 101 edits a template and multimedia content using a template stored in the script storage unit 131, the editing server 101 may instead use a material package template stored in the terminal 102. The material package template used here is not limited to a material package template stored in the terminal 102, and may be a material package template stored in a terminal other than the terminal 102 or another server. In the case of using the template stored in the terminal 102, the user uploads the template stored in the terminal 102 to the editing server 101 beforehand, to register the template in the editing server 101. The editing server 101 registers the materials included in the template, in the template information storage unit 130, the script storage unit 131, and the media data storage unit 132. The editing server 101 may also perform editing such as the template combining process, using the template stored in the script storage unit 131 and the material package template stored in the terminal 102 and, as a result of being uploaded from the terminal 102, received by the editing server 101.

Though the above describes an example where the editing server 101 changes the reproduction scenario according to the processing capability of the terminal, the editing server 101 may change the format of the multimedia content according to the processing capability of the terminal. For example, the editing server 101 may generate 3D multimedia content in the case where the terminal has a 3D (stereoscopic) video display function, and generate 2D multimedia content in the case where the terminal does not have the 3D video display function.

As described above, the multimedia content editing system 100 according to this embodiment can determine or update multimedia content or a media control script included in a template of multimedia content, according to the script processing capability of the reproduction terminal.

Moreover, the multimedia content editing system 100 according to this embodiment can reconfigure multimedia content or a template of multimedia content for a reproduction apparatus having only the media reproduction function, thus enabling the reproduction apparatus to reproduce the same presentation as the multimedia content or the template of the multimedia content.

Furthermore, the multimedia content editing system 100 according to this embodiment can prevent unauthorized use of materials included in multimedia content in a reproduction apparatus of a low security level.

Though the multimedia content editing system 100 according to an aspect of the present invention has been described by way of the embodiment, the present invention is not limited to the embodiment. Modifications obtained by applying various changes conceivable by those skilled in the art to the embodiment and any combinations of structural elements in different embodiments are also included in the present invention without departing from the scope of the present invention.

The structural elements included in the editing server 101 or the terminal 102 or 103 according to the above embodiment may be partly or wholly implemented on one system LSI (Large Scale Integration). The system LSI is ultra-multifunctional LSI produced by integrating a plurality of components on one chip, and is actually a computer system that includes a microprocessor, a ROM (Read Only Memory), a RAM (Random Access Memory), and the like. A computer program is stored in the RAM. The functions of the system LSI are realized by the microprocessor operating in accordance with the computer program.

In the above embodiment, each structural element may be realized by dedicated hardware or execution of a suitable software program. Each structural element may be realized by a program execution unit such as a CPU or a processor reading and executing a software program recorded in a recording medium such as a hard disk or a semiconductor memory.

Though the system LSI is mentioned here, the integrated circuit may be called IC, LSI, super LSI, or ultra LSI, depending on the degree of integration. Moreover, the integrated circuit method is not limited to LSI, and may be realized by a dedicated circuit or a general-purpose processor. An FPGA (Field Programmable Gate Array) which can be programmed or a reconfigurable processor which is capable of reconfiguring connections and settings of circuit cells in LSI after LSI manufacturing may be used.

Furthermore, when an integrated circuit technology that replaces LSI emerges from development of semiconductor technologies or other derivative technologies, such a technology may be used to integrate functional blocks. For instance, biotechnology may be adapted in this way.

The present invention may be realized not only as the editing server 101 or the terminal 102 or 103 including the above characteristic processing units, but also as an editing method including steps corresponding to the characteristic processing units included in the editing server 101 or the terminal 102 or 103. The present invention may also be realized as a computer program causing a computer to execute the characteristic steps included in the editing method. Such a computer program may be distributed via a computer-readable non-transitory recording medium such as a CD-ROM (Compact Disc Read Only Memory) or a communication network such as the Internet.

The division of the functional blocks in the block diagrams is merely an example. A plurality of functional blocks may be realized as one functional block, one functional block may be divided into a plurality of functional blocks, and part of the functions of one functional block may be transferred to another functional block. Besides, the functions of a plurality of functional blocks similar in their functions may be executed by single hardware or software in parallel or in time-sliced fashion.

The order in which the steps included in the multimedia content editing method described above are executed is merely illustrative for specifically describing the present invention, and the steps may be executed in other order. Moreover, at least two of the steps may be executed simultaneously (in parallel).

Though the multimedia content editing system and the multimedia content editing server according to one or more aspects have been described by way of the embodiment above, the present invention is not limited to the embodiment. Modifications obtained by applying various changes conceivable by those skilled in the art to the embodiment and any combinations of structural elements in different embodiments are also included in the scope of one or more aspects without departing from the scope of the present invention.

The technique described in the above aspect(s) can be implemented in, for example, the following types of cloud service, though the types in which the technique described in the above aspect(s) can be implemented are not limited to such.

(Service Type 1: In-House Data Center Type)

Figure 45:
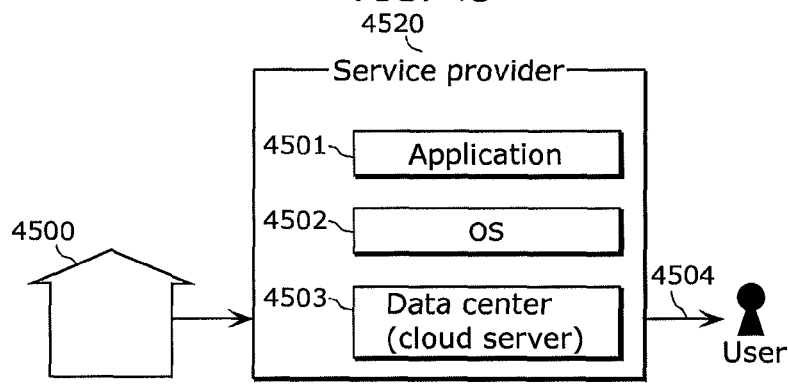
FIG. 45 is a diagram showing a service type 1 (in-house data center type) according to the embodiment.

FIG. 45 shows a service type 1 (in-house data center type). This is a type in which a service provider 4520 obtains information from a group 400 and provides a service to a user. In this type, the service provider 4520 has a function of a data center operating company. That is, the service provider 4520 has a cloud server (a data center 4503) that manages big data. Hence, there is no data center operating company.

In this type, the service provider 4520 operates and manages the data center 4503 (cloud server). The service provider 4520 also manages an OS 4502 and an application 4501. The service provider 4520 performs service provision (4504), using the OS 4502 and the application 4501 managed by the service provider 4520.

(Service Type 2: IaaS Use Type)

Figure 46:
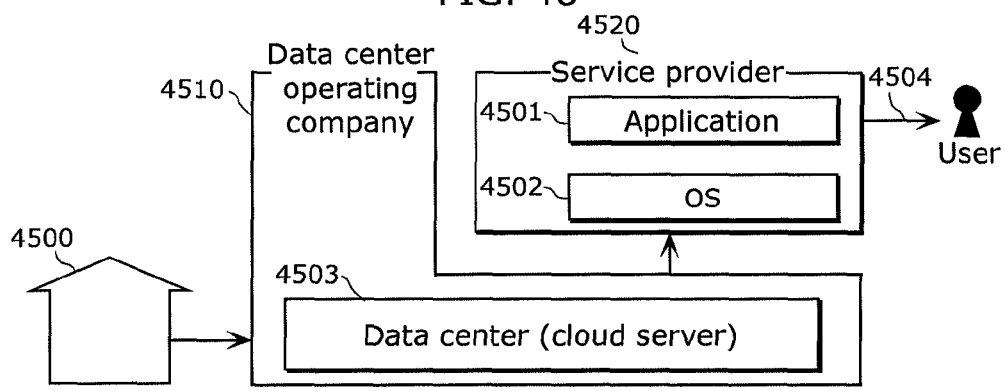
FIG. 46 is a diagram showing a service type 2 (IaaS use type) according to the embodiment.

FIG. 46 shows a service type 2 (IaaS use type). IaaS stands for Infrastructure as a Service. IaaS is a cloud service provision model for providing an infrastructure for building and running a computer system as an Internet service.

In this type, a data center operating company 4510 operates and manages the data center 4503 (cloud server). The service provider 4520 manages the OS 4502 and the application 4501. The service provider 4520 performs service provision (4504), using the OS 4502 and the application 4501 managed by the service provider 4520.

(Service Type 3: PaaS Use Type)

Figure 47:
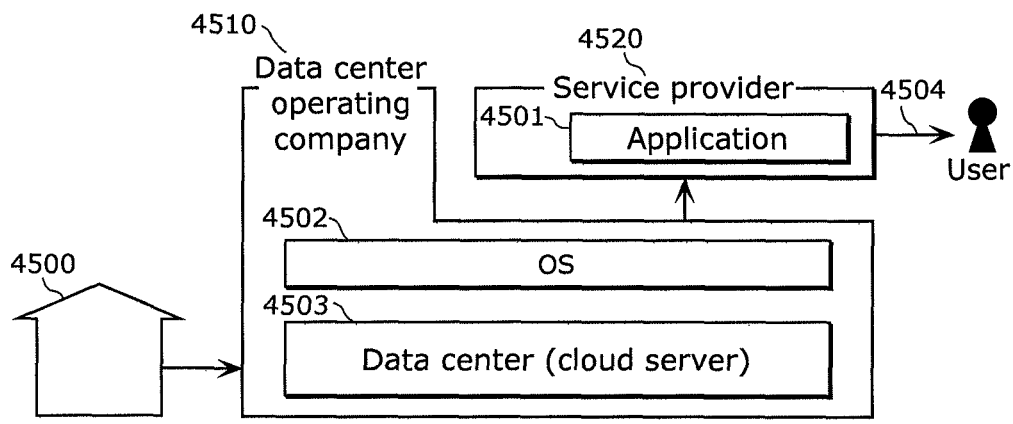
FIG. 47 is a diagram showing a service type 3 (PaaS use type) according to the embodiment.

FIG. 47 shows a service type 3 (PaaS use type). PaaS stands for Platform as a Service. PaaS is a cloud service provision model for providing a platform as a basis for building and running software as an Internet service.

In this type, the data center operating company 4510 manages the OS 4502, and operates and manages the data center 4503 (cloud server). The service provider 4520 manages the application 4501. The service provider 4520 performs service provision (4504), using the OS 4502 managed by the data center operating company 4510 and the application 4501 managed by the service provider 4520.

(Service Type 4: SaaS Use Type)

Figure 48:
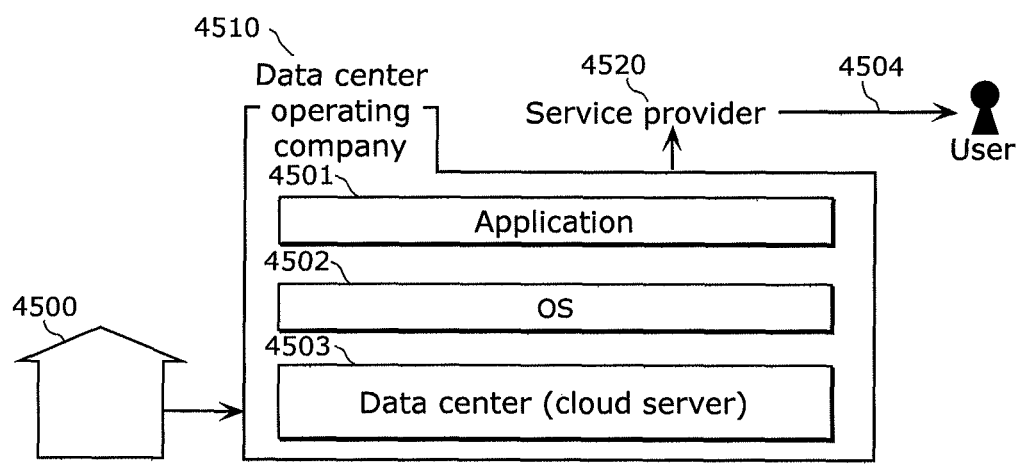
FIG. 48 is a diagram showing a service type 4 (SaaS use type) according to the embodiment.

FIG. 48 shows a service type 4 (SaaS use type). SaaS stands for Software as a Service. SaaS is a cloud service provision model that has a feature of enabling a company or an individual (user) without a data center (cloud server) to use an application provided by a platform provider having a data center (cloud server) via a network such as the Internet, as an example.

In this type, the data center operating company 4510 manages the application 4501, manages the OS 4502, and operates and manages the data center 4503 (cloud server). The service provider 4520 performs service provision (4504), using the OS 4502 and the application 4501 managed by the data center operating company 4510.

The service provider 4520 conducts the service provision act in any of the types mentioned above. For example, the service provider or the data center operating company may develop the OS, the application, a database for big data, and the like on its own, or contract the development to a third party.

INDUSTRIAL APPLICABILITY

The present invention is useful for a multimedia content editing system and a multimedia content editing server.

REFERENCE SIGNS LIST

100 Multimedia content editing system
101 Editing server
102, 103 Terminal
111 Reception unit
112 Script generation unit
113 Multimedia content generation unit
114 Transmission unit
121, 201 Communication unit
122 Format determination unit
123 Processing capability determination unit
124 Security level determination unit
125 Material package generation unit
126 Complete package generation unit
127 Material information embedment unit
128, 207 Script execution unit
129 Material information protection unit
130 Template information storage unit
131 Script storage unit
132 Media data storage unit
133 Content material obtainment unit
202 Processing capability storage unit
203 Content information storage unit
204 Security information storage unit
205 Input unit
206 Content format analysis unit
208 Media reproduction unit
209 Output unit
210 Control unit
301 Script processing capability table
302 Version information
303, 376, 556 Script processing capability information
311 Content information table
312 Multimedia content storage location
313 Editor ID
314, 332, 414, 454, 474, 494, 604 Template ID
315, 334 Theme ID
316, 322, 336, 342 Material table ID 321, 341 Material table
323, 343, 352, 362, 476, 518 Material ID
324, 344, 363, 517 Material type
325, 345, 364, 521 Material data
331 Template table
333 Template name
335 Theme name
337, 405 Template thumbnail
351 Script table
353 Script data
361 Media data table
371 Template editing request message
372, 382, 392, 402, 412, 422, 452, 462, 472, 482, 492, 542, 552, 582, 602, 612 Message identifier
373, 383, 393, 403, 413, 423, 453, 463, 473, 483, 493, 543, 553, 583, 603, 613 Version
374, 554 User ID
375, 555 Script execution unit version
377, 557 Security level
381 Template editing response message
384 Template editing application
391 Template thumbnail request message
401 Template thumbnail response message
404 Template thumbnail count
411 Template representative scene request message
421 Template representative scene response message
424 Template representative scene count
425 Template representative scene
431 Template editing screen
432, 592 Scene display area
433, 593 Material display area
434, 594 Slide bar
435, 595 Play button
436, 596 BGM change button
437, 598 End button
441 Representative scene
451 Decoration image request message
461 Decoration image response message
464 Decoration image count
465, 702 Decoration image
471 Decoration image replacement request message
475 Time code
477 Replacing material ID
481 Decoration image replacement response message
484 Status
491 Template data request message
501 Initial value setting part
502 Drawing processing part
503 BGM reproduction processing part
511 Material data archive
512 Archive type
513 Archive ID
514 Archive file name
515 Archive size
516 Material count
519 Material file name
520 Material size
531 Management information part
532 Data part
533 Object description part
534 Material information description part
541 Template data response message
544 Template data format identifier
545 Template data
551 Content editing request message
581 Content editing response message
584 Content editing application
591 Content editing screen
597 OK button
601 Multimedia content request message
605 Photograph count
606 Photograph
611 Multimedia content response message
614 Multimedia content data format identifier
615 Multimedia content data
701 User image
4500 Group
4501 Application
4502 OS
4503 Data center (cloud server)
4510 Data center operating company
4520 Service provider

The invention claimed is:

1. A multimedia content editing server that generates multimedia content including: media data including an image; and a media control script for controlling a reproduction scenario that includes at least one of a layout, a reproduction order, and a reproduction effect of the media data, the multimedia content editing server comprising:
a script generation unit configured to generate the media control script, according to processing capability information that indicates a processing capability of a terminal apparatus for the media control script;
a multimedia content generation unit configured to generate the multimedia content including the media control script; and
a format determination unit configured to determine a content format of the multimedia content according to the processing capability indicated by the processing capability information,
wherein the multimedia content generation unit is configured to generate the multimedia content in the content format determined by the format determination unit,
the format determination unit is configured to select one of a material package format and a complete package format, as the content format,
the multimedia content generation unit includes:
a script execution unit configured to execute the media control script;
a material package generation unit configured to generate the multimedia content in the material package format in the case where the processing capability is a first value and the format determination unit selects the material package format as the content format, the multimedia content in the material package format including the media data and the media control script; and
a complete package generation unit configured to generate the multimedia content in the complete package format in the case where the processing capability is a second value lower than the first value and the format determination unit selects the complete package format, the multimedia content in the complete package format being video data obtained by the script execution unit executing the media control script, and
the script generation unit is configured to generate, in the case where the processing capability is the first value, the media control script that causes a performance level of the reproduction scenario to be greater than the performance level of the reproduction scenario in the case where the processing capability is the second value.

2. The multimedia content editing server according to claim 1,
wherein the reproduction scenario indicates a movement of the image as the reproduction effect, and the script generation unit is configured to generate, in the case where the processing capability is a first value, the media control script that causes the movement of the image to be larger or faster than in the case where the processing capability is a second value lower than the first value.

3. The multimedia content editing server according to claim 1,
wherein the format determination unit is configured to select the material package format in the case where the processing capability information indicates that the terminal apparatus has a runtime environment for the media control script, and select the complete package format in the case where the processing capability information indicates that the terminal apparatus does not have the runtime environment for the media control script.

4. The multimedia content editing server according to claim 1,
wherein the script generation unit is configured to generate a new media control script by combining a plurality of media control scripts to be updated.

5. The multimedia content editing server according to claim 1,
wherein the script generation unit is configured to generate a new media control script by replacing a part or whole of a media control script to be updated.

6. The multimedia content editing server according to claim 1,
wherein the script generation unit is configured to generate a new media control script by deleting a part of a media control script to be updated.

7. The multimedia content editing server according to claim 1,
wherein the multimedia content generation unit includes
a material information embedment unit configured to add material information to the multimedia content in the case where the format determination unit selects the complete package format, the material information indicating storage locations of the media data and the media control script.

8. The multimedia content editing server according to claim 7,
wherein the multimedia content generation unit further includes
a material information protection unit configured to protect the material information.

9. A multimedia content editing server that generates multimedia content including: media data including an image; and a media control script for controlling a reproduction scenario that includes at least one of a layout, a reproduction order, and a reproduction effect of the media data, the multimedia content editing server comprising:
a script generation unit configured to generate the media control script, according to processing capability information that indicates a processing capability of a terminal apparatus for the media control script;
a multimedia content generation unit configured to generate the multimedia content including the media control script; and
a format determination unit configured to receive a security level of the terminal apparatus from the terminal apparatus, and determine a content format of the multimedia content according to the security level,
wherein the multimedia content generation unit is configured to generate the multimedia content in the content format determined by the format determination unit,
the format determination unit is configured to select one of a material package format and a complete package format, as the content format,
the multimedia content generation unit includes:
a script execution unit configured to execute the media control script;
a material package generation unit configured to generate the multimedia content in the material package format in the case where the processing capability is a first value and the format determination unit selects the material package format as the content format, the multimedia content in the material package format including the media data and the media control script; and
a complete package generation unit configured to generate the multimedia content in the complete package format in the case where the processing capability is a second value lower than the first value and the format determination unit selects the complete package format, the multimedia content in the complete package format being video data obtained by the script execution unit executing the media control script, and
the script generation unit is configured to generate, in the case where the processing capability is the first value, the media control script that causes a performance level of the reproduction scenario to be greater than the performance level of the reproduction scenario in the case where the processing capability is the second value.

10. The multimedia content editing server according to claim 9,
wherein, in the case where the format determination unit selects the complete package format, the multimedia content editing server further: transmits the multimedia content to the terminal apparatus in a download distribution mode in the case where the security level of the terminal apparatus is a first level; and transmits the multimedia content to the terminal apparatus in a streaming distribution mode in the case where the security level of the terminal apparatus is a second level lower than the first level.

11. A multimedia content editing method for generating multimedia content including: media data including an image; and a media control script for controlling a reproduction scenario that includes at least one of a layout, a reproduction order, and a reproduction effect of the media data, the multimedia content editing method comprising:
generating the media control script, according to processing capability information that indicates a processing capability of a terminal apparatus for the media control script;
generating the multimedia content including the media control script; and
determining a content format of the multimedia content according to the processing capability indicated by the processing capability information;
wherein in said generating the multimedia content, the multimedia content is generated in said content format determined in said determining, and
in said determining, one of a material package format and a complete package format is selected as the content format,
said generating the multimedia content comprises:
executing the media control script;
generating the multimedia content in the material package format in the case where the processing capability is a first value and the material package format is selected as the content format in said determining, the multimedia content in the material package format including the media data and the media control script; and generating the multimedia content in the complete package format in the case where the processing capability is a second value lower than the first value and the complete package format is selected in said determining, the multimedia content in the complete package format being video data obtained by the executing of the media control script, and wherein in said generating the media control script, in the case where the processing capability is the first value, the media control script is generated such that a performance level of the reproduction scenario is greater than the performance level of the reproduction scenario in the case where the processing capability is the second value.

12. A non-transitory computer-readable recording medium having recorded thereon a program for causing a computer to execute the multimedia content editing method according to claim 11.

13. An integrated circuit that generates multimedia content including: media data including an image; and a media control script for controlling a reproduction scenario that includes at least one of a layout, a reproduction order, and a reproduction effect of the media data, the integrated circuit comprising:

a script generation unit configured to generate the media control script, according to processing capability information that indicates a processing capability of a terminal apparatus for the media control script; and a multimedia content generation unit configured to generate the multimedia content including the media control script a format determination unit configured to determine a content format of the multimedia content according to the processing capability indicated by the processing capability information, wherein the multimedia content generation unit is configured to generate the multimedia content in the content format determined by the format determination unit, the format determination unit is configured to select one of a material package format and a complete package format, as the content format, the multimedia content generation unit includes:

a script execution unit configured to execute the media control script;

a material package generation unit configured to generate the multimedia content in the material package format in the case where the processing capability is a first value and the format determination unit selects the material package format as the content format, the multimedia content in the material package format including the media data and the media control script; and a complete package generation unit configured to generate the multimedia content in the complete package format in the case where the processing capability is a second value lower than the first value and the format determination unit selects the complete package format, the multimedia content in the complete package format being video data obtained by the script execution unit executing the media control script, and the script generation unit is configured to generate, in the case where the processing capability is the first value, the media control script that causes a performance level of the reproduction scenario to be greater than the performance level of the reproduction scenario in the case where the processing capability is the second value.

* * * * *